(12) United States Patent
Liao et al.

(10) Patent No.: US 12,149,591 B2
(45) Date of Patent: Nov. 19, 2024

(54) METHOD AND APPARATUS FOR AUGMENTED REALITY INTERACTION AND PRESENTATION

(71) Applicant: HISCENE INFORMATION TECHNOLOGY CO., LTD, Shanghai (CN)

(72) Inventors: Chunyuan Liao, Shanghai (CN); Rongxing Tang, Shanghai (CN); Mei Huang, Shanghai (CN)

(73) Assignee: HISCENE INFORMATION TECHNOLOGY CO., LTD, Shanghai (CN)

( * ) Notice: Subject to any disclaimer, the term of this patent is extended or adjusted under 35 U.S.C. 154(b) by 57 days.

(21) Appl. No.: 17/392,135

(22) Filed: Aug. 2, 2021

(65) Prior Publication Data

US 2021/0385299 A1    Dec. 9, 2021

Related U.S. Application Data

(63) Continuation-in-part of application No. 16/044,297, filed on Jul. 24, 2018, now abandoned, which is a
(Continued)

(30) Foreign Application Priority Data

Jan. 25, 2016   (CN) .......................... 201610049175.0

(51) Int. Cl.
*H04L 29/06*      (2006.01)
*G06F 3/01*       (2006.01)
(Continued)

(52) U.S. Cl.
CPC ............ *H04L 67/131* (2022.05); *G06F 3/012* (2013.01); *G06F 3/017* (2013.01); *G06F 3/167* (2013.01);
(Continued)

(58) Field of Classification Search
CPC ....... H04L 67/131; G06F 3/012; G06F 3/017; G06F 3/167; G06F 2203/0381; G06T 19/003
(Continued)

(56) References Cited

U.S. PATENT DOCUMENTS 9,170,117 B1 * 10/2015 Abuelsaad ............ B64C 39/024
9,197,954 B2 * 11/2015 Kim ........................ H04R 1/028
(Continued)

FOREIGN PATENT DOCUMENTS

CN    102508363 A    6/2012
CN    102773822 A    11/2012
(Continued)

*Primary Examiner* — Javid A Amini

(57) ABSTRACT

Embodiments provide a method for implementing augmented reality interaction and presentation, a smart eyewear apparatus, a split-mount device, and a control device, wherein the smart eyewear apparatus implements a better user interaction experience with a linking between online information and offline information and a fusion of virtuality and reality by: establishing a communication connection with a split-mount device based on a communication protocol; transmitting relevant control information to the split-mount device based on the communication protocol; obtaining split-mount feedback data transmitted by the split-mount device based on the communication protocol; and presenting a corresponding augmented reality effect based on the split-mount feedback data, wherein the augmented reality effect includes a virtual image displayed in cooperation with a real scene, a voice effect played, and a vibration effect.

16 Claims, 7 Drawing Sheets

Related U.S. Application Data continuation of application No. PCT/CN2017/078224, filed on Mar. 25, 2017.

(51) Int. Cl.
  *G06F 3/16* (2006.01)
  *G06T 19/00* (2011.01)
  *H04L 67/131* (2022.01)

(52) U.S. Cl.
  CPC .......... *G06T 19/003* (2013.01); *G06T 19/006* (2013.01); *G06F 2203/0381* (2013.01)

(58) Field of Classification Search
  USPC ......................................... 345/633
  See application file for complete search history.

(56) References Cited

U.S. PATENT DOCUMENTS

| | | | | |
|---|---|---|---|---|
| 9,807,725 | B1* | 10/2017 | Vitus | H04W 4/02 |
| 10,262,631 | B1* | 4/2019 | St-Pierre | G06F 3/147 |
| 2011/0098918 | A1* | 4/2011 | Siliski | G06F 1/266 |
| | | | | 701/533 |
| 2011/0270135 | A1 | 11/2011 | Dooley et al. | |
| 2013/0317944 | A1* | 11/2013 | Huang | G01S 5/02521 |
| | | | | 455/457 |
| 2014/0149060 | A1* | 5/2014 | Meduna | G06F 1/3206 |
| | | | | 702/94 |
| 2014/0198130 | A1* | 7/2014 | Lacroix | G06F 3/016 |
| | | | | 345/633 |
| 2014/0267263 | A1 | 9/2014 | Beckwith et al. | |
| 2014/0354691 | A1 | 12/2014 | Hing et al. | |
| 2015/0193885 | A1* | 7/2015 | Akiva | G07C 5/0841 |
| | | | | 705/4 |
| 2015/0268548 | A1 | 9/2015 | Park et al. | |
| 2015/0301592 | A1* | 10/2015 | Miller | G02B 27/017 |
| | | | | 345/156 |
| 2016/0195923 | A1* | 7/2016 | Nauseef | A47C 7/72 |
| | | | | 297/344.21 |
| 2016/0379485 | A1* | 12/2016 | Anastassov | G08G 1/0129 |
| | | | | 701/117 |
| 2017/0011465 | A1* | 1/2017 | Anastassov | G06Q 40/08 |
| 2018/0224291 | A1* | 8/2018 | Tuukkanen | G08G 1/096811 |
| 2020/0183387 | A1* | 6/2020 | Heit | G06V 20/58 |
| 2021/0270620 | A1* | 9/2021 | Nepomuceno | G01C 21/3626 |

FOREIGN PATENT DOCUMENTS

| | | |
|---|---|---|
| CN | 103488994 A | 1/2014 |
| CN | 103888163 A | 6/2014 |
| CN | 103970265 A | 8/2014 |
| CN | 104049739 A | 9/2014 |
| CN | 104554049 A | 4/2015 |
| CN | 104808795 A | 7/2015 |
| CN | 204462541 U | 7/2015 |
| CN | 105031918 A | 11/2015 |
| CN | 105172599 A | 12/2015 |
| CN | 105182662 A | 12/2015 |

* cited by examiner

METHOD AND APPARATUS FOR AUGMENTED REALITY INTERACTION AND PRESENTATION

CROSS-REFERENCES TO RELATED APPLICATIONS

This application is a Continuation in part of pending U.S. patent application Ser. No. 16/044,297, filed Jul. 24, 2018, which claims priority from CN patent application 201610049175.0, filed on Jan. 25, 2016, the entireties of which are herein incorporated by reference.

FIELD

Embodiments of the present disclosure generally relate to an augmented reality technology in the computer field, and more particularly relate to a technology for augmented reality smart eyewear.

BACKGROUND

Augmented reality (AR) is an innovative human-machine interaction technology in a sub-field of natural picture recognition technologies, which overlays in real time digital information such as a virtual 3D animation, a video, a text, and a picture to a real scene and displays to realize a natural interaction with a real object or a user. The augmented reality highlights a natural human-machine visual interaction with fusion of virtuality and reality. The augmented reality technology covers new technologies and new means such as multimedia, 3D modeling, real-time video display and control, multi-sensor fusion, real-time tracking and registration, scene fusion, etc. The advanced and novel nature of the augmented reality technology causes its applications and promotions ever stagnant.

In the era of Mobile Internet, a core technical problem for human-machine interaction is how to connect between a current offline real scene and online virtual information and interaction in an efficient, simple, and natural manner.

In the prior art, the core for implementing a connection technology is a computer's perception of an offline object, including detection, recognition, and tracking. There are substantially two means for implementing such perception: manually labelling the offline object, or automatically recognizing the offline object by a computer. The former includes technologies such as two-dimensional code, NFC, and WiFi positioning, etc., which are required to modify each target object and thus have drawbacks such as limited functions, high costs in deployment and maintenance, unnatural interaction, and lack of intuition and aesthetics, etc. The latter is based on a natural picture recognition technology to perform intelligent analysis of image data acquired by a camera, automatically determine the identity, category, space posture and other information of the object, which requires no change to the target object and thus is more approximate to natural interaction of human.

Therefore, it has become a mainstream task in the industry how to implement a better user interaction experience with a linking between online information and offline information and a fusion of virtuality and reality.

SUMMARY

An object of the present disclosure is to provide a method for implementing augmented reality interaction and presentation, a smart eyewear apparatus, a split-mount device, and a control device, so as to implement a better user interactive experience with a linking between online information and offline information and a fusion of virtuality and reality.

According to one aspect of the present disclosure, there is provided a method, at a smart eyewear apparatus end, for implementing augmented reality interaction and presentation, comprising:
  A. establishing a communication connection with a split-mount device based on a communication protocol;
  B. transmitting relevant control information to the split-mount device based on the communication protocol;
  C. obtaining split-mount feedback data transmitted by the split-mount device based on the communication protocol; and
  D. presenting a corresponding augmented reality effect based on the split-mount feedback data.

According to an embodiment of the present disclosure, there is provided a method, at a smart eyewear apparatus end, for implementing augmented reality interaction and presentation in driving monitoring, comprising:
  A1 establishing a communication connection with a driving monitor split-mount device based on a communication protocol;
  B1 transmitting relevant control information to the driving monitor split-mount device based on the communication protocol, wherein the relevant control information includes at least any one of the following: real-time positioning control information, real-time video recording control information, and real-time voice navigation control information;
  C1 obtaining split-mount feedback data transmitted by the driving monitor split-mount device based on the communication protocol, the split-mount feedback data includes driving information obtained by the driving monitor split-mount device, wherein the driving information includes at least any one of the following: velocity information, barrier information, and pedestrian information; and
  D1 performing a corresponding business logic based on the split-mount feedback data, and presenting a corresponding augmented reality effect based on an execution result of the business logic, wherein the business logic includes at least any one of the following: displaying key navigation information, and prompting barrier information or pedestrian information.

According to another embodiment of the present disclosure, there is provided a method, at a smart eyewear apparatus end, for implementing augmented reality interaction and presentation in a game control, comprising:
  A2 establishing a communication connection with a game control split-mount device based on a communication protocol;
  B2 transmitting relevant control information to the game control split-mount device based on the communication protocol, wherein the relevant control information includes at least any one of the following: control information on acquiring perception data, and control information on displaying special effect;
  C2 obtaining split-mount feedback data transmitted by the game control split-mount device based on the communication protocol, wherein the split-mount feedback data includes game relevant information obtained by the game control split-mount device, wherein the game relevant information includes: user operation information; and
  D2 executing a corresponding business logic based on the split-mount feedback data, and presenting a corresponding augmented reality effect related to the game based on an execution result of the business logic.

According to one aspect of the present disclosure, there is provided a method, at a split-mount device end, for cooperating to implement augmented reality interaction and presentation, comprising:
 a. establishing a communication connection with a smart eyewear apparatus based on a communication protocol;
 b. obtaining relevant control information transmitted by the smart eyewear apparatus based on the communication protocol;
 c. collecting acquired data based on the relevant control information, and analyzing the acquired data to generate split-mount feedback data; and
 d. transmitting the split-mount feedback data to the smart eyewear apparatus based on the communication protocol so as to cooperate with the smart eyewear apparatus to present a corresponding augmented reality effect.

According to another aspect of the present disclosure, there is provided a method, at a control device end, for cooperating to implement augmented reality interaction and presentation, wherein the control device is physically detached from a smart eyewear apparatus, the method comprising:
 aa. obtaining split-mount feedback data transmitted by the smart eyewear apparatus;
 bb. parsing relevant information of the split-mount feedback data; and
 cc. executing a corresponding business logic based on the relevant information of the split-mount feedback data to determine displaying information of a corresponding augmented reality effect, and transmitting the displaying information of the corresponding augmented reality effect to the smart eyewear apparatus.

According to another aspect of the present disclosure, there is provided a smart eyewear apparatus for implementing augmented reality interaction and presentation, comprising:
 a first device configured for establishing a communication connection with a split-mount device based on a communication protocol;
 a second device configured for transmitting relevant control information to the split-mount device based on the communication protocol;
 a third device configured for obtaining split-mount feedback data transmitted by the split-mount device based on the communication protocol; and
 a fourth device configured for presenting a corresponding augmented reality effect based on the split-mount feedback data, wherein the augmented reality effect includes a virtual image displayed in cooperation with a real scene, a voice effect played, and a vibration effect.

According to an embodiment of the present disclosure, there is provided a smart eyewear apparatus for implementing augmented reality interaction and presentation in driving monitoring, comprising:
 a first device configured for establishing a communication connection with a driving monitor split-mount device based on a communication protocol;
 a second device configured for transmitting relevant control information to the driving monitor split-mount device based on the communication protocol, wherein the relevant control information includes at least any one of the following: real-time positioning control information, real-time video recording control information, and real-time voice navigation control information;
 a third device configured for obtaining split-mount feedback data transmitted by the driving monitor split-mount device based on the communication protocol, the split-mount feedback data includes driving information obtained by the driving monitor split-mount device, wherein the driving information includes at least any one of the following: velocity information, barrier information, and pedestrian information; and
 a fourth device configured for performing a corresponding business logic based on the split-mount feedback data, and presenting a corresponding augmented reality effect based on an execution result of the business logic, wherein the business logic includes at least any one of the following: displaying key navigation information, and prompting barrier information or pedestrian information.

According to another embodiment of the present disclosure, there is provided a smart eyewear apparatus for implementing augmented reality interaction and presentation in a game control, comprising:
 a first device configured for establishing a communication connection with a game control split-mount device based on a communication protocol;
 a second device configured for transmitting relevant control information to the game control split-mount device based on the communication protocol, wherein the relevant control information includes at least any one of the following: control information on acquiring perception data, and control information on displaying special effect;
 a third device configured for obtaining the split-mount feedback data transmitted by the game control split-mount device based on the communication protocol, wherein the split-mount feedback data includes game relevant information obtained by the game control split-mount device, wherein the game relevant information includes: user operation information; and
 a fourth device configured for executing a corresponding business logic based on the split-mount feedback data, and presenting a corresponding augmented reality effect related to the game based on an execution result of the business logic.

According to another aspect of the present disclosure, there is provided a split-mount device for cooperating to implement augmented reality interaction and presentation, comprising:
 a fifth device configured for establishing a communication connection with a smart eyewear apparatus based on a communication protocol;
 a sixth device configured for obtaining relevant control information transmitted by the smart eyewear apparatus based on the communication protocol;
 a seventh device configured for collecting acquired data based on the relevant control information, and comprehensively analyzing the acquired data to generate split-mount feedback data; and
 an eighth device configured for transmitting the split-mount feedback data to the smart eyewear apparatus based on the communication protocol so as to cooperate with the smart eyewear apparatus to present a corresponding augmented reality effect.

According to another aspect of the present disclosure, there is provided a control device for cooperating to implement augmented reality interaction and presentation, wherein the control device is physically detached from a smart eyewear apparatus, the control device comprising:
  a twelfth device configured for obtaining split-mount feedback data transmitted by the smart eyewear apparatus;
  a thirteenth device configured for parsing relevant information of the split-mount feedback data, wherein the relevant information includes at least any one of the following: priority information, presentation related information, and parameter information; and
  a fourteenth device configured for executing a corresponding business logic based on the relevant information of the split-mount feedback data to determine displaying information of a corresponding augmented reality effect, and transmitting the displaying information of the corresponding augmented reality effect to the smart eyewear apparatus.

According to a further aspect of the present disclosure, there is provided a system for augmented reality interaction and presentation, comprising the foregoing smart eyewear apparatus and the foregoing split-mount device.

According to a still further aspect of the present disclosure, there is provided a system for augmented reality interaction and presentation, comprising the foregoing smart eyewear apparatus, the foregoing split-mount device, and the foregoing control device.

Compared with the prior art, the method for implementing augmented reality interaction and presentation, the smart eyewear apparatus, and the split-mount device according to the embodiments of the present disclosure may better implement a better user interaction experience with a linking between online information and offline information and a fusion of virtuality and reality by: establishing a communication connection between the smart eyewear apparatus and the split-mount device based on a communication protocol, wherein the smart eyewear apparatus as the core of interaction, may control the split-mount device to implement a corresponding function; and presenting a corresponding augmented reality effect based on split-mount feedback data transmitted from the split-mount device to thereby extend a function of the smart eyewear apparatus to the split-mount device; and further presenting the split-mount feedback data from the split-mount device onto the smart eyewear apparatus. In some embodiments, the split-mount device and the smart eyewear apparatus are physically detached.

Further, by configuring a control device physically detached from the smart eyewear apparatus and establishing a communication connected between them in a wired or wireless manner, processing core business logic (including relevant control information of the split-mount device, multimodal scene fusion processing, etc.) of the smart eyewear apparatus is taken over by the control device, such that the smart eyewear apparatus per se may become smaller in size and lighter in weight; besides, use discomfort for users caused by over heat radiation of the smart eyewear apparatus may be avoided.

BRIEF DESCRIPTION OF THE DRAWINGS

Other features, objectives, and advantages of the present disclosure will become more apparent through reading the detailed description of the non-limiting embodiments with reference to the drawings below.

In the drawings, like or similar reference numerals represent like or similar components.

DETAILED DESCRIPTION OF THE DISCLOSURE

Figure 1:
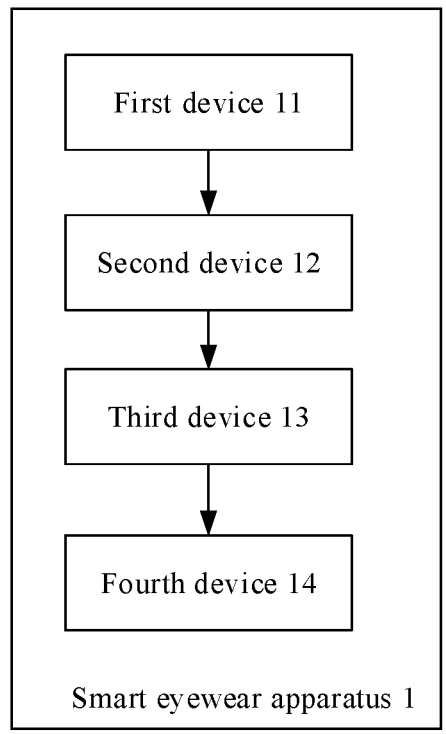
FIG. 1 shows an apparatus schematic diagram of a smart eyewear apparatus for implementing augmented reality interaction and presentation provided according to one aspect of the present disclosure.

Hereinafter, the present disclosure will be described in further detail with reference to the accompanying drawings:

FIG. 1 shows an apparatus schematic diagram of a smart eyewear apparatus 1 for implementing augmented reality interaction and presentation provided according to one aspect of the present disclosure, wherein the smart eyewear apparatus 1 comprises: a first device 11, a second device 12, a third device 13, and a fourth device 14.

Particularly, the first device 11 establishes a communication connection with a split-mount device 2 based on a communication protocol; the second device 12 transmits relevant control information to the split-mount device 2 based on the communication protocol; the third device 13 obtains split-mount feedback data transmitted by the split-mount device 2 based on the communication protocol; and the fourth device 14 presents a corresponding augmented reality effect based on the split-mount feedback data.

Here, the augmented reality effect refers to an effect obtained by: simulating, by a smart eyewear apparatus, entity effects (including visual information, and auditory, gustatory, and haptic senses) which are originally hardly experienced in the real world in a certain temporal and spatial range, and then overlaying the simulated effects to present to the real world. Particularly, the augmented reality effect may include a virtual image displayed in cooperation with a real scene, an audio effect played, and a vibration effect.

Here, the smart eyewear apparatus 1 is a wearable smart device that implements a better user interaction experience with a linking between online information and offline information and a fusion between virtuality and reality, which is a software interaction manner with an eyewear as a hardware carrier fused with AR (Augmented Reality). The smart eyewear apparatus 1 may employ any operating system, e.g., an Android operating system, an iOS operating system, etc. The hardware device of the smart eyewear apparatus 1 may include: a camera input module (e.g., an RGB camera, a three-dimensional camera, etc.), a perception input module (e.g., an inertial measurement unit IMU, including an electronic compass, an accelerometer, an angular velocity transducer, a gyroscope, etc.), a voice input module (e.g., a speaker, etc.), a display screen, a voice playing device, a haptic output device, and a data processing module, etc. Of course, the hardware devices included in the smart eyewear apparatus 1 as described above are only exemplary, and any possibly emerging smart eyewear apparatus 1 in future, if applicable to the present disclosure, may be still incorporated herein by reference.

Here, the split-mount device 2 is physically separate from the smart eyewear apparatus, and may be an electronic device which may automatically perform numerical computation and information processing according to preset or stored instructions, hardware of which includes, but not limited to, a microprocessor, an application-specific integrated circuit (ASIC), a field programmable gate array (FPGA), a digital processor (DSP), an embedded device, etc. The split-mount device 2 may be a device having an autonomous processing capability, which may have an independent and complete function. Before being connected to the smart eyewear apparatus, the split-mount device may run as a standalone device; while after being connected to the smart eyewear apparatus, the split-mount device may exchange data (processed data) with the smart eyewear apparatus through a protocol and receive instructions therefrom to perform a specified function; for example, a driving control device, a video playing device, etc.; the split-mount device 2 may also be an electronic device accessory, which, with the smart eyewear apparatus as a control and processing center, inputs acquired data (unprocessed data) to the eyewear after being connected to the smart eyewear apparatus through the protocol, accepts and outputs the data processed by the eyewear, and performs the specified functions, for example, a gaming accessory (a joystick, a glove, or other gaming gears), a mouse, a keyboard, etc. Of course, those skilled in the art may understand that the split-mount devices 2 above are only examples, and other existing or future possibly emerging split-mount devices 2, if applicable to the present application, should also be incorporated in the protection scope of the present disclosure and are thus incorporated here by reference.

In some embodiments, the split-mount device has one or more cameras. Furthermore, the split-mount device may acquire sound signals with some pickups, which are independently incorporated into the split-mount device, or integrated into one of the cameras. When the split-mount device receives the control information from the smart eyewear apparatus, the split-mount device configures the camera(s) to acquire data according to the control information. The acquired data includes at least one of the following: image acquisition data and voice acquisition data. Because of the physical separation of the split-mount device and the smart eyewear apparatus, a user wearing the smart eyewear apparatus, may use the split-mount device to capture the image acquisition data outside of the view of the user and/or the smart eyewear apparatus, by putting the split-mount device on an appropriate place. The split-mount feedback data may be the acquired data or the processing result of the acquired data.

In some embodiments, a worker wearing the smart eyewear apparatus, may put the split-mount device into a box which is too narrow to accommodate himself/herself, and get to know what's going on in the box with assistance of the split-mount device and the smart eyewear apparatus.

In some embodiments, a doctor wearing the smart eyewear apparatus, may put the split-mount device into a room where is dangerous for human, and get to know what's going on in the room with assistance of the split-mount device and the smart eyewear apparatus. The smart eyewear apparatus 1 according to the present disclosure may control the split-mount device 2 to implement corresponding functions with the smart eyewear apparatus 1 as a core for interaction by establishing a communication connection with the split-mount device 2 based on a communication protocol, and present a corresponding augmented reality effect based on the split-mount feedback data transmitted by the split-mount device 2 such that a function of the smart eyewear apparatus 1 is extended to the split-mount device 2, and the split-mount feedback data of the split-mount device 2 are presented on the smart eyewear apparatus 1, thereby better implementing a better user interaction experience with a linking between online information and offline information and a fusion of virtuality and reality.

First, the first device 11 may establish a communication connection using one or more DPSes (Device Proxy Services), and the DPSes and split-mount devices 2 may correspond in one-to-one or one-to-multiple manner; the communication protocol between the DPSes and the split-mount devices 2 may be identical or different dependent on specific split-mount devices 2 or definitions of corresponding applications; the communication protocols for the DPS and the smart eyewear apparatus 1 need to be uniformed to implement that the smart eyewear apparatus 1 is matched to different split-mount devices 2.

In some embodiments, the first device 11 may establish a communication connection with the split-mount device 2 in a wired or wireless manner based on the communication protocol.

In the present disclosure, the wired manner may include, but not limited to, a data line, and the wireless manner may include, but not limited to, WiFi (wireless wideband), and Bluetooth, etc. Of course, any other future possibly emerging communication connection manners may also be incorporated here by reference.

Next, the second device 12 transmits relevant control information to the split-mount device 2 based on the communication protocol. In some embodiments, the second device 12 of the smart eyewear apparatus 1 encapsulates some control commands through the DPS and then transmits the relevant control information to a corresponding split-mount device 2, e.g., control information such as "start" and "stop"; of course, the control information above is only exemplary and voice-based; other complex control information or control information in different language patterns, e.g., binary data, various computer languages, etc., may be incorporated herein by reference.

In some embodiments, the smart eyewear apparatus receives a profile of the split-mount device, and compares the profiles of the smart eyewear apparatus and the split-mount device, and transmits relevant control information to the split-mount device which is of better profile than the other device; otherwise, the smart eyewear apparatus cancels the relevant control information to the split-mount device. The profile of the split-mount device includes, but not limited to, camera resolution, hardware configuration, and current workload. For example, if the camera resolution of the split-mount device is higher than that of the smart eyewear apparatus, the smart eyewear apparatus transmits relevant control information to the split-mount device. For example, if the current workload of the split-mount device is lower than that of the smart eyewear apparatus, the smart eyewear apparatus transmits relevant control information to the split-mount device.

Then, the third device 13 obtains the split-mount feedback data transmitted by the split-mount device 2 based on the communication protocol; wherein the third device 13, after obtaining the split-mount feedback data, may parse the corresponding split-mount feedback data using the DPS or communication protocol to generate information that is recognizable to the smart eyewear apparatus 1. For example, a driving monitor split-mount device 2 transmits the acquired "Barrier in Front" data. The smart eyewear apparatus receives the split-mount feedback data, and extracts the data "Barrier in Front" using the communication protocol between the split-mount device and the smart eyewear apparatus.

Next, the fourth device 14 presents a corresponding augmented reality effect based on the split-mount feedback data, wherein the augmented reality effect includes a virtual image displayed in cooperation with a real scene, a voice effect played, and a vibration effect. In some embodiments, the fourth device 14 will execute a corresponding business logic based on the split-mount feedback data, and convey corresponding prompt information to the user on the smart eyewear apparatus 1 using a display screen, a voice play module and an output module based on a display rule determined by the business logic. Continued with the above example, after receiving the split-mount feedback data "Barrier in Front" transmitted by the driving monitor split-mount device 2, the fourth device 14 analyzes the split-mount feedback data to determine a need to prompt the user of a barrier in front, and then determines an augmented reality effect for the content of prompt information, for example, the barrier that needs to be tracked and highlighted on the display screen, invoking a voice playing device to play a prompt tone, or invoking a haptic output device to initiate vibration, etc.

In some embodiments, the smart eyewear apparatus also has one or more cameras, which are used to capture first images of the view of the user or the smart eyewear apparatus. The smart eyewear apparatus presents a corresponding augmented reality effect based on the first images and the split-mount feedback data, wherein the split-mount feedback data includes the second images captured, by the split-mount device. The smart eyewear apparatus detects whether the first images and the second images are about the same view, by comparing the first images and the second images; if so, the smart eyewear apparatus selects the one of higher accuracy from these two ones according to the camera performance of the smart eyewear apparatus and the split-mount device, and determines an augmented reality effect corresponding to the chosen one. For example, if the first images and the second images are about the same view, and the camera in the split-mount device is of higher resolution than that of the smart eyewear apparatus, the smart eyewear apparatus would choose the second images, and determine an augmented reality effect corresponding to the chosen one.

In some embodiments, the smart eyewear apparatus also has one or more cameras, which are used to capture first images of the view of the user or the smart eyewear apparatus. The smart eyewear apparatus presents a corresponding augmented reality effect based on the first images and the split-mount feedback data, wherein the split-mount feedback data includes the second images captured, by the split-mount device, from a different view than that of the user or the smart eyewear apparatus. For example, the smart eyewear apparatus determines a corresponding augmented reality effect based on the first images and the second images, and present the augmented reality effect. Because the first images and the second images are from different views, the augmented reality effect presented by the smart eyewear apparatus is more appropriate for the user's situations. For example, the smart eyewear apparatus determines a first topic of the first images and a second topic of the second images respectively, selects the one of higher priority from these two topics, and determines an augmented reality effect corresponding to the chosen topic. For example, the smart eyewear apparatus determines a first topic of the first images and a second topic of the second images respectively, selects the one of higher priority from these two topics, and determines an augmented reality effect corresponding to the chosen topic. The priority of a topic may be determined based on the importance, urgence or classification of the topic in the scene where the user is in. Supposing that a user is driving a car, the topic of a barrier in front of the car is more urgent than topic of weather outside of the car, the priority of the barrier topic is higher than that of the weather topic.

For example, the smart eyewear apparatus determines a first topic of the first images and a second topic of the second images respectively, and determines an augmented reality effect corresponding to these two topics.

For example, the smart eyewear apparatus determines a first topic of the first images and a second topic of the second images respectively, determines a first augmented reality effect and a second augmented reality effect corresponding to these two topics respectively, and presents both the first augmented reality effect and the second augmented reality effect.

Because the first images and the second images collaboratively offer a wider view than only the second images, the smart eyewear apparatus will provide more comprehensive information for its user.

In some embodiments, the fourth device 14 may directly process and present the split-mount feedback data; in some embodiments, the fourth device 14 comprises: a forty-first unit (not shown) and a forty-second unit (not shown). In some embodiments, the forty-first unit parses relevant information of the split-mount feedback data, wherein the relevant information includes at least any one of: priority information, presentation-related information, and parameter information of the split-mount feedback data, etc.; for example, continued with the above example, after receiving the split-mount feedback data "Barrier in Front" transmitted by the driving monitor split-mount device 2, the smart eyewear apparatus 1 analyzes the split-mount feedback data to determine a need to prompt the user of the barrier in front; then, it first determines the priority information of the prompt content, e.g., whether it has priority over current navigation voice (e.g., "please drive straightly," "please turn right 500 meters ahead") information to be played, and then analyzes the presentation-related information and the parameter information, so as to determine the content of prompt information, for example, the barrier that needs to be tracked and highlighted on the display screen, invoking a voice playing device to play a prompt tone, or invoking a haptic output device to initiate vibration, etc. The forty-second unit executes the corresponding business logic based on relevant information of the split-mount feedback data to determine displaying information of the corresponding augmented reality effect, wherein the displaying information includes at least any one of the following: virtual image presentation information, voice presentation information, and vibration presentation information. Here, the forty-second unit may execute the corresponding business logic according to the split-mount feedback data based on relevant information of the split-mount feedback data to obtain an output result of the relevant information. The specific business logic may be set and determined based on a specific scene, which will not be detailed here.

Besides, for a split-mount device 2 having a logic processing capability, the split-mount feedback data transmitted thereby may directly carry its own relevant information, e.g., "playing an emergency prompt voice in highest priority"; then the forty-first unit may directly obtain relevant information based on the split-mount feedback data without a need of analyzing the logic of the split-mount feedback data, and then the forty-second unit executes the corresponding business logic based on relevant information of the split-mount feedback data. For example, the smart eyewear apparatus detects whether the split-mount feedback data includes the relevant information; if so, the smart eyewear apparatus executes a business logic based on the relevant information to generate displaying information, and presents the displaying information; if not, the smart eyewear apparatus determines a corresponding augmented reality effect based on the split-mount feedback data, and presents the augmented reality effect. For example, the smart eyewear apparatus inspects whether the split-mount feedback data includes any keyword reserved in the communication protocol between the smart eyewear apparatus and the split-mount device, so as to determine whether the split-mount feedback data includes the relevant information or not. If the split-mount feedback data includes a keyword, the smart eyewear apparatus extracts the value of the keyword from the split-mount feedback data, and generates the displaying information by executing the business logic and the value of the keyword. As a result, the smart eyewear apparatus provides displaying information in a more efficient way.

In another embodiment, the fourth device 14 may also transmit the split-mount feedback data to the control device 3 cooperating with the smart eyewear apparatus 1. In some embodiments, the fourth device 14 includes a forty-third unit (not shown) and a forty-fourth unit (not shown), wherein the forty-third unit transmits the split-mount feedback data to the control device 3; the forty-fourth unit obtains displaying information of the corresponding augmented reality effect determined by the control device 3 parsing the split-mount feedback data, wherein the displaying information includes at least any one of the following: virtual image presentation information, voice presentation information, and vibration presentation information.

Here, the control device 3 is configured for processing the core business logic of the smart eyewear apparatus 1, which may be physically detached from and connected in a wired or wireless manner with the smart eyewear apparatus 1; by physically detaching the control device 3 for processing the core business logic from the smart eyewear apparatus 1, the smart eyewear apparatus 1 may become smaller in size and lighter in weight; besides, use discomfort for users caused by over heat radiation of the smart eyewear apparatus 1 may be avoided.

Additionally, the fourth device 14 further comprises: a forty-fifth unit (not shown) that transmits, to the split-mount device 2, auxiliary control information for controlling a presentation auxiliary effect based on the business logic. The auxiliary control information may be for example information for controlling a touch device, a voice device or a display device of the split-mount device 2 to perform a corresponding cooperative presentation, which further improves user interaction experience.

According to an embodiment of the present disclosure, the smart eyewear apparatus 1 may obtain multimodal scene information via multiple channels, perform fusion processing to the multimodal scene information, and then generate relevant control information. In some embodiments, the second device 12 further comprises: a twenty-first unit (not shown) configured for obtaining multimodal scene information, the multimodal scene information including real scene information, virtual scene information, and user operation information, wherein the user operation information includes at least any one of the following: gesture information, voice information, perception information, and touch operation information; a twenty-second unit (not shown) configured for comprehensively processing the multimodal scene information to generate the relevant control information.

The second device 12 receives the user's input information in various natural language interaction manners through different channels (i.e., various input modules) to analyze the user behavior information and determine an operation object, an operation action, and an operation parameter, wherein the operation object is the corresponding split-mount device 2.

Here, the real scene information may be an image, a photograph, a scene image, a real object image, or an object with a specific shape, etc. The augmented reality effect may include an associated augmented reality content (including, but not limited to, video, audio, link, 2D animation, 3D animation, etc.) and a corresponding augmented reality display effect.

The twenty-first unit may acquire multimodal input information of respective channels using a plurality of hardware, for example: an RGB camera of the smart eyewear apparatus for acquiring scene image information, a depth camera of the smart eyewear apparatus for acquiring gesture information, a microphone of the smart eyewear apparatus for acquiring voice information, and a touch panel of the smart eyewear apparatus for acquiring touch information, etc.; of course, the input information acquired by the twenty-first unit and the hardware devices in use are not limited. Any possibly emerging acquiring manner or acquiring devices may be incorporated herein by reference.

The twenty-second unit may first perform recognition preprocessing to the plurality of input information of the corresponding input modules, respectively, using different processing modules to generate a plurality of the structured data, wherein the processing modules include a scene image recognition module, a gesture recognition module, a voice recognition module, a touch recognition module, and a perception recognition module, processes input information of each channel using a corresponding recognition module, including extracting features and/or analyzing meanings, and outputting structured data (the structures of the structured data corresponding to the input information of each channel may be identical or different, which are only required to be eligible for fusion processing and arbitration analysis); and then performs fusion processing and arbitration analysis to the plurality of structured data to generate relevant control information commands, wherein the fusion and arbitration rules or a training model pre-defined or pre-trained (including an initial set of rules or an initial training model defined by a developer, or a model updated by the user based on a rule or model) may be used, and the rule may be a relationship between natural interaction manners (e.g., a cooperation or contention relationship between a gesture and a voice, etc.), or a machine learning model (e.g., a decision tree, a random forest, etc.); in some embodiments, raw data of the input information may be directly processed using a deep learning model so as to generate relevant control information commands.

According to another embodiment of the present disclosure, the smart eyewear apparatus 1 may obtain multimodal scene information via multiple channels, transmit the multimodal scene information to the control device 3 for fusion processing, and then obtain the generated relevant control information from the control device 3. In some embodiments, the second device further comprises: a twenty-third unit (not shown) configured for obtaining multimodal scene information, the multimodal scene information including real scene information, virtual scene information, and user operation information, wherein the user operation information includes at least any one of the following: gesture information, voice information, perception information, and touch operation information; a twenty-fourth unit (not shown) configured for transmitting the multimodal scene information to the control device 3; a twenty-fifth unit (not shown) configured for obtaining the relevant control information generated by the control device 3 based on comprehensive processing of the multimodal scene information; and a twenty-sixth unit (not shown) configured for transmitting relevant control information to the split-mount device 2 based on the communication protocol.

By receiving the data streams of multiple input devices, recognizing, positioning, and tracking the object, modelling a surrounding physical scene (real model), overlaying the virtual model and the real model, implementing interaction between the virtual model and the real model in a uniform and hybrid model, and then transmitting the relevant control information generated based on the interaction result to the corresponding split-mount device 2, the smart eyewear apparatus 1 according to the embodiment of the present disclosure further improves the user equipment interaction experience over the prior art in which the split-mount device 2 is controlled through simple key and touch operations.

In some embodiments, each input/output module in the smart eyewear apparatus may be provided with a corresponding module to process corresponding data and implement adaptation to the core logic processing module to thereby guarantee that the core logic processing module is irrelevant with the specific input/output device, which reduces the dependency of core logic processing and further enhances scalability of the smart eyewear apparatus 1.

Figure 2:
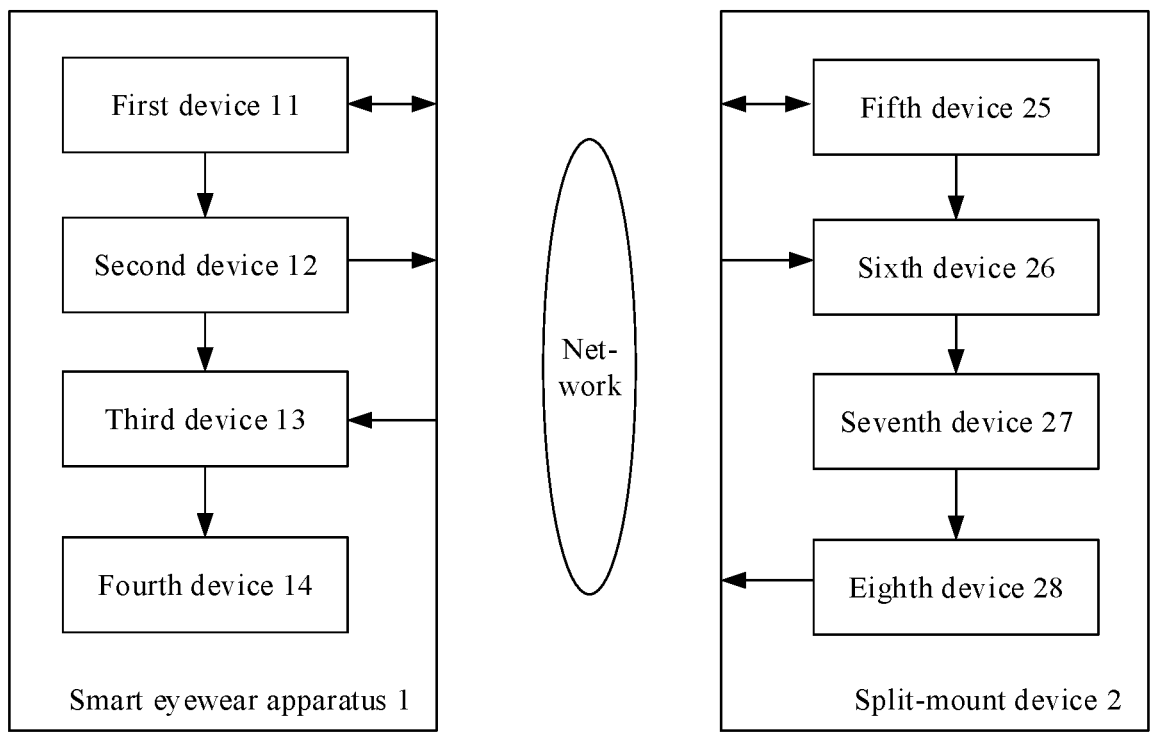
FIG. 2 shows an apparatus schematic diagram of cooperation between a smart eyewear apparatus 1 and a split-mount device 2 for implementing augmented reality interaction and presentation provided according to an embodiment of the present disclosure.

FIG. 2 shows an apparatus schematic diagram of cooperation between a smart eyewear apparatus 1 for implementing augmented reality interaction and presentation and a split-mount device 2 provided according to an embodiment of the present disclosure.

The smart eyewear apparatus comprises a first device 11, a second device 12, a third device 13, and a fourth device 14, wherein the first device 11, the second device 12, the third device 13, and the fourth device 14 as shown in FIG. 2 are identical or substantially identical to the first device 11, the second device 12, the third device 13, and the fourth device 14 shown in FIG. 1. For the sake of brevity, they are not detailed here, but incorporated herein by reference.

Here, the split-mount device 2 may be an electronic device which may automatically perform numerical computation and information processing according to preset or stored instructions, hardware of which includes, but not limited to, a microprocessor, an application-specific integrated circuit, a field programmable gate array, a digital processor (DSP), an embedded device, etc. The split-mount device 2 may be a device having an autonomous processing capability, which may have an independent and complete function. Before being connected to the smart eyewear apparatus, the split-mount device may run as a standalone device; while after being connected to the smart eyewear apparatus, the split-mount device may exchange data (processed data) with the smart eyewear apparatus through a protocol and receive instructions therefrom to perform specified functions; for example, a driving control device, a video display device, etc.; the split-mount device 2 may also be an electronic device accessory, which, with the smart eyewear apparatus as a control and processing center, inputs acquired data (unprocessed data) to the eyewear after being connected to the smart eyewear apparatus through the protocol, accepts and outputs the data processed by the eyewear, and performs the specified functions; e.g., a gaming accessory (a joystick, a glove, or other gaming gears), a mouse, a keyboard, etc. Of course, those skilled in the art may understand that the split-mount devices 2 above are only examples, and other existing or future possibly emerging split-mount devices 2, if applicable to the present application, should also be incorporated in the protection scope of the present disclosure and are thus incorporated herein by reference.

In some embodiments, the split-mount device may establish a communication connection with the smart eyewear apparatus 1 in a wired or wireless manner. The split-mount device 2 comprises: a fifth device 25, a sixth device 26, a seventh device 27, and an eighth device 28. In some embodiments, the fifth device 25 establishes a communication connection with the first device 11 of the smart eyewear apparatus 1 based on a communication protocol; the sixth device 26 obtains relevant control information transmitted by the second device 12 of the smart eyewear apparatus 1 based on the communication protocol; the seventh device 27 collects the acquired data based on the relevant control information and comprehensively analyzes the acquired data to generate split-mount feedback data; and the eighth device 28 transmits the split-mount feedback data to the third device 13 of the smart eyewear apparatus 1 based on the communication protocol so as to cooperate with the smart eyewear apparatus 1 to present a corresponding augmented reality effect.

Further, the split-mount device 2 further comprises an eleventh device (not shown), the eleventh device obtains auxiliary control information the smart eyewear apparatus 1 executes the corresponding business logic based on the split-mount feedback data and transmits, and displays the corresponding auxiliary effect based on the auxiliary control information, wherein the auxiliary effect includes at least any one of: auxiliary voice effect, auxiliary vibration effect, and auxiliary visual effect.

Further, the seventh device 27 comprises: a seventy-first unit (not shown), and a seventy-second unit (not shown). In some embodiments, the seventy-first unit collects the acquired data based on the relevant control information, the multimodel acquired data including at least any one of the following: image acquisition data, data acquired for perception positioning, and voice acquisition data; the seventy-second unit comprehensively analyzes the acquired data and obtains relevant information of the split-mount feedback data, wherein relevant information of the split-mount feedback data includes at least any one of the following: priority information, presentation-related information, and parameter information.

One aspect of the present disclosure provides a system for augmented reality interaction and presentation, the system comprising a smart eyewear apparatus and a split-mount device, wherein the smart eyewear apparatus and the split-mount device, as well as the contents regarding their cooperation, are identical or substantially identical to the smart eyewear apparatus 1 and the split-mount device 2, as well as the contents regarding their cooperation, as shown in FIG. 2; for the sake of brevity, they will not be detailed here, but incorporated herein by reference.

Figure 3:
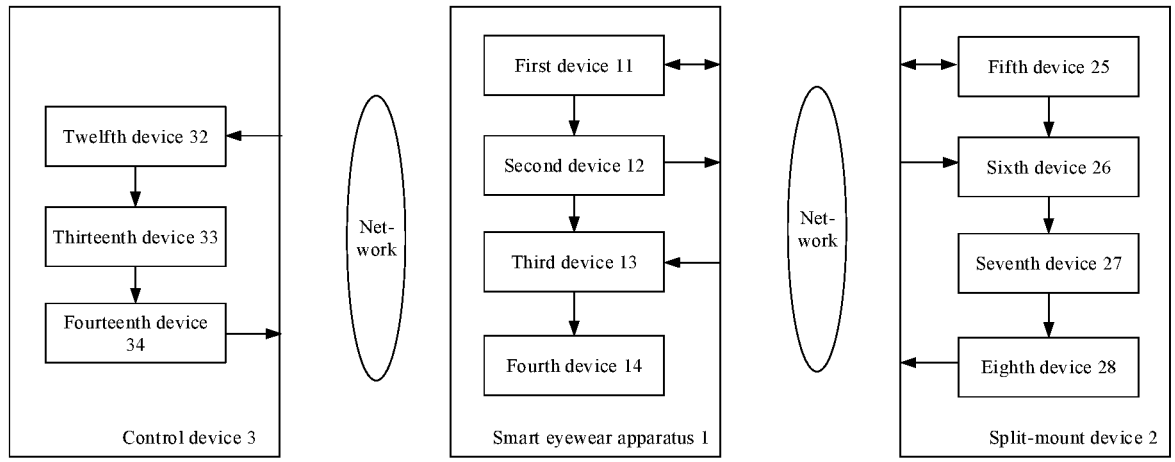
FIG. 3 shows an apparatus schematic diagram of cooperation between a smart eyewear apparatus for implementing augmented reality interaction and presentation, a split-mount device, and a control device provided according to an embodiment of the present disclosure.

FIG. 3 shows an apparatus schematic diagram of cooperation between a smart eyewear apparatus 1, a split-mount device 2, and a control device 3 for implementing augmented reality interaction and presentation provided according to an embodiment of the present disclosure.

The smart eyewear apparatus comprises a first device 11, a second device 12, a third device 13, and a fourth device 14, wherein the first device 11, the second device 12, the third device 13, and the fourth device 14 as shown in FIG. 3 are identical or substantially identical to the first device 11, the second device 12, the third device 13, and the fourth device 14 shown in FIG. 1. For the sake of brevity, they are not detailed here, but incorporated herein by reference. The split-mount device 2 comprises a fifth device 25, a sixth device 26, a seventh device 27, and an eighth device 28, wherein the fifth device 25, the sixth device 26, the seventh device 27, and the eighth device 28 as shown in FIG. 3 are identical or substantially identical to the fifth device 25, the sixth device 26, the seventh device 27, and the eighth device 28 shown in FIG. 2. For the sake of brevity, they are not detailed here, but incorporated herein by reference.

Here, the control device 3 may be an electronic device which may automatically perform numerical computation and information processing according to preset or stored instructions, hardware of which includes, but not limited to, a microprocessor, an application-specific integrated circuit (ASIC), a field programmable gate array (FPGA), a digital processor (DSP), an embedded device, etc. The control device 3 may be a device having an autonomous processing capability, which may have an independent and complete function. After being connected to the smart eyewear apparatus, the control device 3 may assist the smart eyewear apparatus to establish a core technical logic, store relevant data, and feedback relevant control information, etc. Besides, the control device 3 may further provide a touch input device available for the user to perform a touch operation. Of course, those skilled in the art may understand that the control devices 3 above is only an example, and other existing or future possibly emerging control device 3, if applicable to the present application, should also be included in the protection scope of the present disclosure and is thus incorporated herein by reference.

Particularly, the control device 3 is physically detached from the smart eyewear apparatus 1 and may establish a communication connection with the smart eyewear apparatus 1 in a wired or wireless manner.

Particularly, the control device 3 includes: a twelfth device 32, a thirteenth device 33, and a fourteenth device 34. In some embodiments, the twelfth device 32 acquires the split-mount feedback data that are fed back from the split-mount device 2 and transmitted from the smart eyewear apparatus 1; the thirteenth device 33 parses relevant information of the split-mount feedback data, wherein the relevant information includes at least any one of the following: priority information, presentation related information, and parameter information; and the fourteenth device 34 executes the corresponding business logic based on the relevant information of the split-mount feedback data to determine displaying information of the corresponding augmented reality effect, wherein the displaying information includes at least any one of the following: virtual image presentation information, voice presentation information, and vibration presentation information, and transmits the displaying information of the corresponding augmented reality effect to the smart eyewear apparatus.

Further, the control device 3 further comprises: a fifteenth device (not shown) and a sixteenth device (not shown), wherein the fifteenth device obtains multimodal scene information transmitted by the smart eyewear apparatus, the multimodal scene information including real scene information, virtual scene information, and user operation information which are acquired by the smart eyewear apparatus, wherein the user operation information includes at least any one of the following: gesture information, voice information, perception information, and touch operation information; and wherein the sixteenth device comprehensively processes the multimodal scene information to generate the relevant control information and transmits the relevant control information to the smart eyewear apparatus 1.

The control device 3 may also have an operation input function. In some embodiments, the control device further comprises: a seventeenth device (not shown) configured for obtaining touch operation information of the user for the control device, and transmitting the touch operation information to the smart eyewear apparatus. Correspondingly, the sixteenth device may also be configured for comprehensively processing the multimodal scene information and the touch operation information so as to generate the relevant control information.

One aspect of the present disclosure provides a system for augmented reality interaction and presentation, the system comprising a smart eyewear apparatus, a split-mount device, and a control device, wherein the smart eyewear apparatus, the split-mount device, and the control device, as well as the contents regarding their cooperation, are identical or substantially identical to the smart eyewear apparatus 1, the split-mount device 2, and the control device, as well as the contents regarding their cooperation, as shown in FIG. 3; for the sake of brevity, they will not be detailed here, but incorporated herein by reference.

Figure 4:
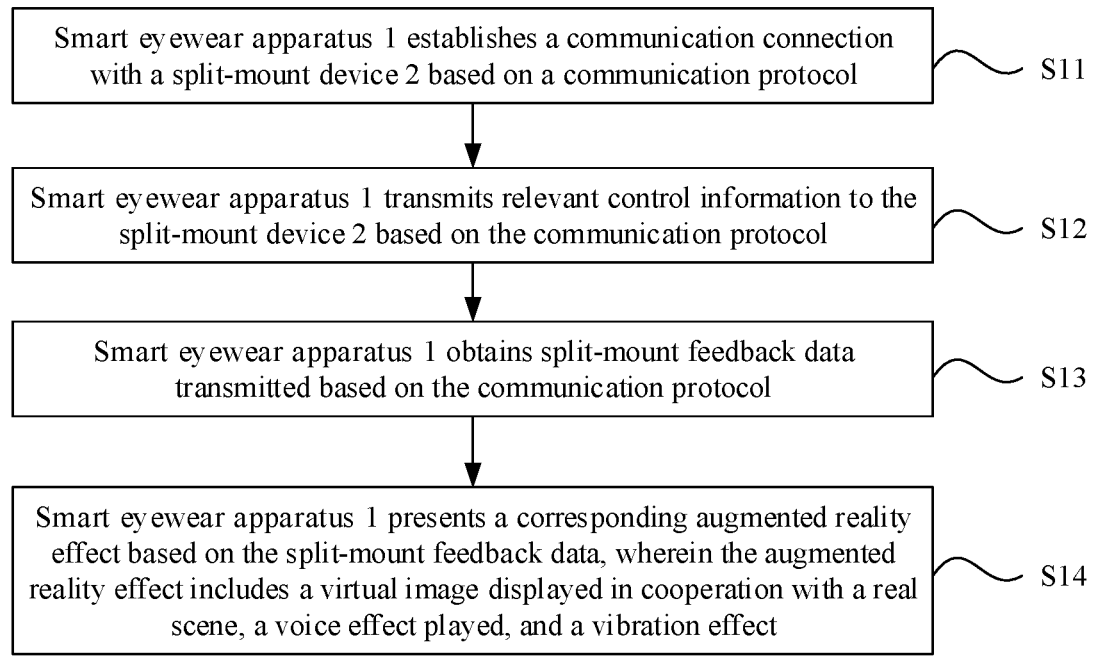
FIG. 4 shows a method schematic diagram of implementing augmented reality interaction and presentation by a smart eyewear apparatus provided according to one aspect of the present disclosure.

FIG. 4 shows a method schematic diagram of implementing augmented reality interaction and presentation by a smart eyewear apparatus provided according to one aspect of the present disclosure; wherein the method comprising a step S11, a step S12, a step S13 and a step S14.

Particularly, in the step S11, the smart eyewear apparatus 1 establishes a communication connection with a split-mount device 2 based on a communication protocol; in the step S12, the smart eyewear apparatus 1 transmits relevant control information to the split-mount device 2 based on the communication protocol; in the step S13 the smart eyewear apparatus 1 obtains split-mount feedback data transmitted by the split-mount device 2 based on the communication protocol; and in the step S14, the smart eyewear apparatus 1 presents a corresponding augmented reality effect based on the split-mount feedback data, wherein the augmented reality effect includes a virtual image displayed in cooperation with a real scene, a voice effect played, and a vibration effect.

Here, the smart eyewear apparatus 1 is a wearable smart device that implements a better user interaction experience with a linking between online information and offline information and a fusion between virtuality and reality, which is a software interaction manner with an eyewear as a hardware carrier fused with AR (Augmented Reality). The smart eyewear apparatus 1 may employ any operating system, e.g., an Android operating system, an iOS operating system, etc. The hardware device of the smart eyewear apparatus 1 may include: a camera input module (e.g., an RGB camera, a three-dimensional camera, etc.), a sensing input module (e.g., an inertial measurement unit IMU, including an electronic compass, an accelerometer, an angular velocity transducer, a gyroscope, etc.), a voice input module (e.g., a speaker, etc.), a display screen, a voice playing device, a haptic output device, and a data processing module, etc. Of course, the hardware devices included in the smart eyewear apparatus 1 as described above are only exemplary, and any possibly emerging smart eyewear apparatus 1 in future, if applicable to the present disclosure, may be still incorporated herein by reference.

The smart eyewear apparatus 1 according to the present disclosure may control the split-mount device 2 to implement corresponding functions with the smart eyewear apparatus 1 as a core for interaction by establishing a communication connection with the split-mount device 2 based on a communication protocol, and present a corresponding augmented reality effect based on the split-mount feedback data transmitted by the split-mount device 2 such that a functions of the smart eyewear apparatus 1 is extended to the split-mount device 2, and the split-mount feedback data of the split-mount device 2 are presented on the smart eyewear apparatus 1, thereby better implementing a better user interaction experience with a linking between online information and offline information and a fusion of virtuality and reality.

First, in the step S11, the smart eyewear apparatus 1 may establish a communication connection using one or more DPSes (Device Proxy Services), and the DPSes and split-mount devices 2 may correspond in one-to-one or one-to-multiple manner; the communication protocol between the DPSes and the split-mount devices 2 may be identical or different dependent on specific split-mount devices 2 or definitions of corresponding applications; the communication protocols for the DPS and the smart eyewear apparatus 1 need to be uniformed to implement that the smart eyewear apparatus 1 is matched to different split-mount devices 2.

In some embodiments, in the step S11, the smart eyewear apparatus 1 may establish a communication connection with the split-mount device 2 in a wired or wireless manner based on the communication protocol.

In the present disclosure, the wired manner may include, but not limited to, a data line, and the wireless manner may include, but not limited to, WiFi (wireless wideband), and Bluetooth, etc. Of course, any other future possibly emerging communication connection manners may also be incorporated here by reference.

Next, in the step S12, the smart eyewear apparatus 1 transmits relevant control information to the split-mount device 2 based on the communication protocol. In some embodiments, in the step S12, the smart eyewear apparatus 1 encapsulates some control commands through the DPS and then transmits the relevant control information to a corresponding split-mount device 2, e.g., control information such as "start" and "stop"; of course, the control information above is only exemplary and voice-based; other complex control information or control information in different language patterns, e.g., binary data, various computer languages, etc., may be incorporated herein by reference.

Then, in the step S13, the smart eyewear apparatus 1 obtains the split-mount feedback data transmitted by the split-mount device 2 based on the communication protocol; wherein in the step S13, the smart eyewear apparatus 1, after obtaining the split-mount feedback data, may parse the corresponding split-mount feedback data using the DPS or communication protocol to generate information that is recognizable to the smart eyewear apparatus 1. For example, a driving monitor split-mount device 2 transmits the acquired "Barrier in Front" data. The smart eyewear apparatus receives the split-mount feedback data, and extracts the data "Barrier in Front" using the communication protocol between the split-mount device and the smart eyewear apparatus.

Next, in the step S14, the smart eyewear apparatus 1 presents a corresponding augmented reality effect based on the split-mount feedback data, wherein the augmented reality effect includes a virtual image displayed in cooperation with a real scene, a voice effect played, and a vibration effect. In some embodiments, in the step S14, the smart eyewear apparatus 1 will execute a corresponding business logic based on the split-mount feedback data, and convey corresponding prompt information to the user on the smart eyewear apparatus 1 using a display screen, a voice play module and an output module based on a display rule determined by the business logic. Continued with the above example, after receiving the split-mount feedback data "Barrier in Front" transmitted by the driving monitor split-mount device 2, in the step S14, the smart eyewear apparatus 1 analyzes the split-mount feedback data to determine a need to prompt the user of a barrier in front, and then determines an augmented reality effect for the content of prompt information, for example, the barrier that needs to be tracked and highlighted on the display screen, invoking a voice playing device to play a prompt tone, or invoking a haptic output device to initiate vibration, etc.

In some embodiments, the smart eyewear apparatus also has one or more cameras, which are used to capture first images of the view of the user or the smart eyewear apparatus. The smart eyewear apparatus presents a corresponding augmented reality effect based on the first images and the split-mount feedback data, wherein the split-mount feedback data includes the second images captured, by the split-mount device, from a different view than that of the user or the smart eyewear apparatus. For example, the smart eyewear apparatus determines a corresponding augmented reality effect based on the first images and the second images, and present the augmented reality effect. Because the first images and the second images are from different views, the augmented reality effect presented by the smart eyewear apparatus is more appropriate for the user's situations. For example, the smart eyewear apparatus determines a first topic of the first images and a second topic of the second images respectively, selects the one of higher priority from these two topics, and determines an augmented reality effect corresponding to the chosed topic. For example, the smart eyewear apparatus determines a first topic of the first images and a second topic of the second images respectively, selects the one of higher priority from these two topics, and determines an augmented reality effect corresponding to the chosen topic. The priority of a topic may be determined based on the importance, urgence or classification of the topic in the scene where the user is in. Supposing that a user is driving a car, the topic of a barrier in front of the car is more urgent than topic of weather outside of the car, the priority of the barrier topic is higher than that of the weather topic.

For example, the smart eyewear apparatus determines a first topic of the first images and a second topic of the second images respectively, and determines an augmented reality effect corresponding to these two topics.

For example, the smart eyewear apparatus determines a first topic of the first images and a second topic of the second images respectively, determines a first augmented reality effect and a second augmented reality effect corresponding to these two topics respectively, and presents both the first augmented reality effect and the second augmented reality effect.

Because the first images and the second images collaboratively offer a wider view than only the second images, the smart eyewear apparatus will provide more comprehensive information for its user.

In some embodiments, in the step S14, the smart eyewear apparatus 1 may directly process and present the split-mount feedback data. In some embodiments, the step S14 comprises: parsing relevant information of the split-mount feedback data, wherein the relevant information includes at least any one of: priority information, presentation-related information, and parameter information of the split-mount feedback data, etc.; for example, continued with the above example, after receiving the split-mount feedback data "Barrier in Front" transmitted by the driving monitor split-mount device 2, the smart eyewear apparatus 1 analyzes the split-mount feedback data to determine a need to prompt the user of the barrier in front; then, it first determines the priority information of the prompt content, e.g., whether it has priority over current navigation voice (e.g., "please drive straightly," "please turn right 500 meters ahead") information to be played, and then analyzes the presentation-related information and the parameter information, so as to determine the content of prompt information, for example, the barrier that needs to be tracked and highlighted on the display screen, invoking a voice playing device to play a prompt tone, or invoking a haptic output device to initiate vibration, etc. The smart eyewear apparatus 1 executes the corresponding business logic based on relevant information of the split-mount feedback data to determine displaying information of the corresponding augmented reality effect, wherein the displaying information includes at least any one of the following: virtual image presentation information, voice presentation information, and vibration presentation information. Here, the smart eyewear apparatus 1 may execute the corresponding business logic according to the split-mount feedback data to obtain an output result of the relevant information. The specific business logic may be set and determined based on a specific scene, which will not be detailed here.

Besides, for a split-mount device 2 having a logic processing capability, the split-mount feedback data transmitted thereby may directly carry its own relevant information, e.g., "playing an emergency prompt voice in highest priority"; then the smart eyewear apparatus 1 may directly obtain relevant information based on the split-mount feedback data without a need of analyzing the logic of the split-mount feedback data, and then execute the corresponding business logic. For example, the smart eyewear apparatus detects whether the split-mount feedback data includes the relevant information; if so, the smart eyewear apparatus executes a business logic based on the relevant information to generate displaying information, and presents the displaying information; if not, the smart eyewear apparatus determines a corresponding augmented reality effect based on the split-mount feedback data, and presents the augmented reality effect. For example, the smart eyewear apparatus inspects whether the split-mount feedback data includes any keyword reserved in the communication protocol between the smart eyewear apparatus and the split-mount device, so as to determine whether the split-mount feedback data includes the relevant information or not. If the split-mount feedback data includes a keyword, the smart eyewear apparatus extracts the value of the keyword from the split-mount feedback data, and generates the displaying information by executing the business logic and the value of the keyword. As a result, the smart eyewear apparatus provides displaying information in a more efficient way.

In another embodiment, in the step S14 the split-mount feedback data may also be transmitted to the control device 3 cooperating with the smart eyewear apparatus 1. In some embodiments, the step S14 comprises: transmitting the split-mount feedback data to the control device 3; obtaining displaying information of the corresponding augmented reality effect determined by the control device 3 parsing the split-mount feedback data, wherein the displaying information includes at least any one of the following: virtual image presentation information, voice presentation information, and vibration presentation information.

Here, the control device 3 is configured for processing the core business logic of the smart eyewear apparatus 1, which may be physically detached from and connected in a wired or wireless manner with the smart eyewear apparatus 1; by physically detaching the control device 3 for processing the core business logic from the smart eyewear apparatus 1, the smart eyewear apparatus 1 may become smaller in size and lighter in weight; besides, use discomfort for users caused by over heat radiation of the smart eyewear apparatus 1 may be avoided.

Additionally, the step S14 further comprises: transmitting, to the split-mount device 2, auxiliary control information for controlling the split-mount device 2 to present an auxiliary effect based on the business logic. The auxiliary control information may be for example information for controlling a touch device, a voice device or a display device of the split-mount device 2 to perform a corresponding cooperative presentation, which further improves user interaction experience.

According to an embodiment of the present disclosure, the smart eyewear apparatus 1 may obtain multimodal scene information via multiple channels, perform fusion processing to the multimodal scene information, and then generate relevant control information. In some embodiments, the step S12 further comprises: obtaining multimodal scene information, the multimodal scene information including real scene information, virtual scene information, and user operation information, wherein the user operation information includes at least any one of the following: gesture information, voice information, perception information, and touch operation information; comprehensively processing the multimodal scene information to generate the relevant control information.

Here, the real scene information may be an image, a photograph, a scene image, a real object image, or an object with a specific shape, etc. The augmented reality effect may include an associated augmented reality content (including, but not limited to, video, audio, link, 2D animation, 3D animation, etc.) and a corresponding augmented reality display effect.

Particularly, the smart eyewear apparatus 1 may acquire multimodal input information of respective channels using a plurality of hardware, for example: an RGB camera of the smart eyewear apparatus for acquiring scene image information, a depth camera of the smart eyewear apparatus for acquiring gesture information, a microphone of the smart eyewear apparatus for acquiring voice information, and a touch panel of the smart eyewear apparatus for acquiring touch information, etc.; of course, the input information acquired by the smart eyewear apparatus 1 and the hardware devices in use are not limited. Any possibly emerging acquiring manner or acquiring devices may be incorporated herein by reference.

The smart eyewear apparatus 1 may first perform recognition preprocessing to the plurality of input information of the corresponding input modules, respectively, using different processing modules to generate a plurality of the structured data, wherein the processing modules include a scene image recognition module, a gesture recognition module, a voice recognition module, a touch recognition module, and a perception recognition module, processing input information of each channel using a corresponding recognition module, including extracting features and/or analyzing meanings, and outputting structured data (the structures of the structured data corresponding to the input information of each channel may be identical or different, which are only required to be eligible for fusion processing and arbitration analysis); and then perform fusion processing and arbitration analysis to the plurality of structured data to generate relevant control information commands, wherein the fusion and arbitration rules or a training model pre-defined or pre-trained (including an initial set of rules or an initial training model defined by a developer, or a model updated by the user based on a rule or model) may be used, and the rule may be a relationship between natural interaction manners (e.g., a cooperation or contention relationship between a gesture and a voice, etc.), or a machine learning model (e.g., a decision tree, a random forest, etc.); in some embodiments, raw data of the input information may be directly processed using a deep learning model so as to generate relevant control information commands.

According to another embodiment of the present disclosure, the smart eyewear apparatus 1 may obtain multimodal scene information via multiple channels, transmit the multimodal scene information to the control device 3 for fusion processing, and then obtain the generated relevant control information from the control device 3. In some embodiments, the step S12 further comprises: obtaining multimodal scene information, the multimodal scene information including real scene information, virtual scene information, and user operation information, wherein the user operation information includes at least any one of the following: gesture information, voice information, perception information, and touch operation information; transmitting the multimodal scene information to the control device 3; obtaining the relevant control information generated by the control device 3 based on comprehensive processing of the multimodal scene information; and transmitting relevant control information to the split-mount device 2 based on the communication protocol.

By receiving the data streams of multiple input devices, recognizing, positioning, and tracking the object, modelling a surrounding physical scene (real model), overlaying the virtual model and the real model, implementing interaction between the virtual model and the real model in a uniform and hybrid model, and then transmitting the relevant control information generated based on the interaction result to the corresponding split-mount device 2, the smart eyewear apparatus 1 according to the embodiment of the present disclosure further improves the user equipment interaction experience over the prior art in which the split-mount device 2 is controlled through simple key and touch operations.

In some embodiments, each input/output module in the smart eyewear apparatus 1 may be provided with a corresponding module to process corresponding data and implement adaptation to the core logic processing module to thereby guarantee that the core logic processing module is irrelevant with the specific input/output device, which reduces the dependency of core logic processing and further enhances scalability of the smart eyewear apparatus 1.

Figure 5:
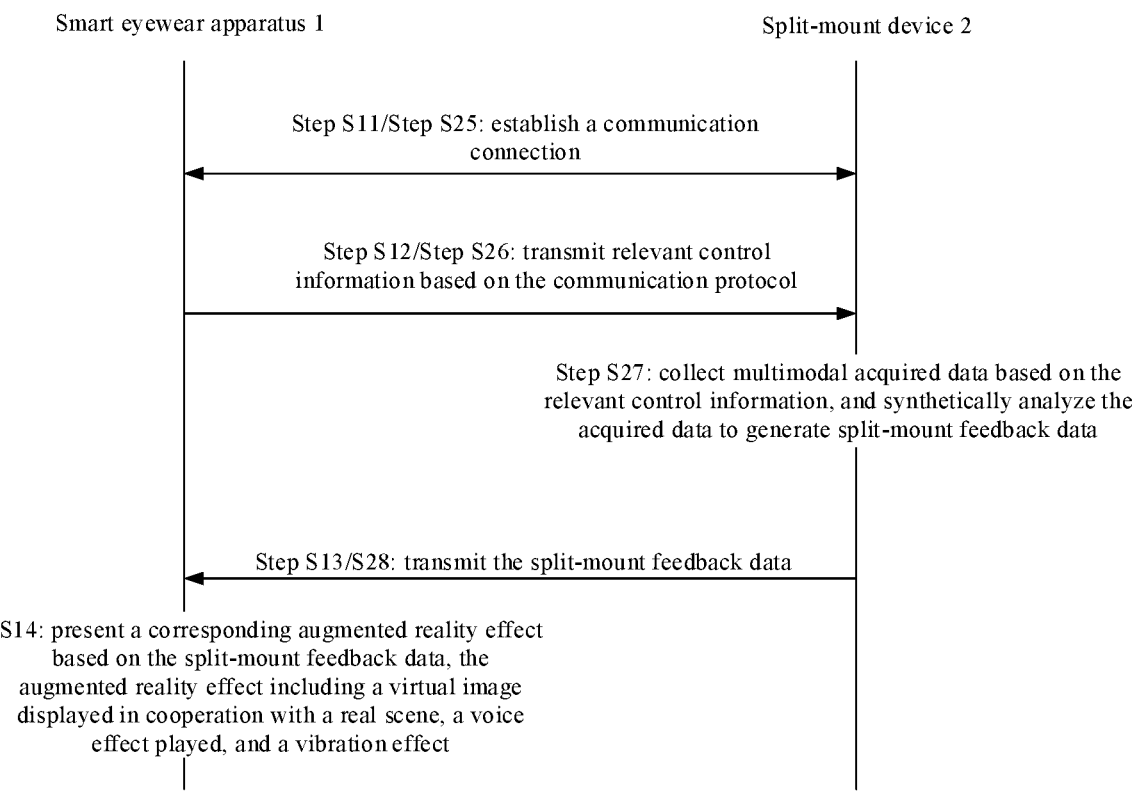
FIG. 5 shows a method schematic diagram of implementing augmented reality interaction and presentation through cooperation between a smart eyewear apparatus and a split-mount device provided according to an embodiment of the present disclosure.

FIG. 5 shows a method schematic diagram of implementing augmented reality interaction and presentation through cooperation between a smart eyewear apparatus and a split-mount device provided according to an embodiment of the present disclosure.

The method implemented in the smart eyewear apparatus end comprises a step S11, a step S12, a step S13, and a step S14, wherein the step S11, the step S12, the step S13, and the step S14 as shown in FIG. 5 are identical or substantially identical to the step S11, the step S12, the step S13, and the step S14 shown in FIG. 4. For the sake of brevity, they are not detailed here, but incorporated herein by reference.

The method implemented in the split-mount device 2 end comprises a step S25, a step S26, a step S27, and a step S28, wherein in the step S25, the split-mount device 2 establishes a communication connection with of a smart eyewear apparatus 1 based on a communication protocol; in the step S26, the split-mount device 2 obtains relevant control information transmitted by the smart eyewear apparatus 1 in the step S12 based on the communication protocol; in the step S27, the split-mount device 2 collects acquired data based on the relevant control information, and comprehensively analyzes the acquired data to generate split-mount feedback data; and in the step S28, the split-mount device 2 transmits the split-mount feedback data to the smart eyewear apparatus 1 based on the communication protocol so as to cooperate with the smart eyewear apparatus 1 to present a corresponding augmented reality effect.

Here, the split-mount device 2 may be an electronic device which may automatically perform numerical computation and information processing according to preset or stored instructions, hardware of which includes, but not limited to, a microprocessor, an application-specific integrated circuit, a field programmable gate array, a digital processor (DSP), an embedded device, etc. The split-mount device 2 may be a device having an autonomous processing capability, which may have an independent and complete function. Before being connected to the smart eyewear apparatus, the split-mount device may run as a standalone device; while after being connected to the smart eyewear apparatus, the split-mount device may exchange data (processed data) with the smart eyewear apparatus through a protocol and receive instructions therefrom to perform specified functions; for example, a driving control device, a video display device, etc.; the split-mount device 2 may also be an electronic device accessory, which, with the smart eyewear apparatus as a control and processing center, inputs acquired data (unprocessed data) to the eyewear after being connected to the smart eyewear apparatus through the protocol, accepts and outputs the data processed by the eyewear, and performs the specified functions; e.g., a gaming accessory (a joystick, a glove, or other gaming gears), a mouse, a keyboard, etc. Of course, those skilled in the art may understand that the split-mount devices 2 above are only examples, and other existing or future possibly emerging split-mount devices 2, if applicable to the present application, should also be incorporated in the protection scope of the present disclosure and are thus incorporated herein by reference.

In some embodiments, the split-mount device may establish a communication connection with the smart eyewear apparatus 1 in a wired or wireless manner.

Further, the method further comprises: obtaining, by the split-mount device 2, auxiliary control information the smart eyewear apparatus 1 executes the corresponding business logic executed based on the split-mount feedback data and transmits, and presenting the corresponding auxiliary effect based on the auxiliary control information, wherein the auxiliary effect includes at least any one of: auxiliary voice effect, auxiliary vibration effect, and auxiliary visual effect.

Further, the step S27 comprises: collecting the acquired data based on the relevant control information, the multi-model acquired data including at least any one of the following: image acquisition data, data acquired for perception positioning, and voice acquisition data; comprehensively analyzing the acquired data and obtaining relevant information of the split-mount feedback data, wherein relevant information of the split-mount feedback data includes at least any one of the following: priority information, presentation-related information, and parameter information.

On the basis of the smart eyewear apparatus 1 shown in FIG. 1, there is provided a smart eyewear apparatus 1 for implementing augmented reality interaction and presentation in driving monitoring according to an embodiment of the present disclosure, wherein the smart eyewear apparatus 1 comprising:
 a first device configured for establishing a communication connection with a driving monitor split-mount device based on a communication protocol;
 a second device configured for transmitting relevant control information to the driving monitor split-mount device based on the communication protocol, wherein the relevant control information includes at least any one of the following: real-time positioning control information, real-time video recording control information, and real-time voice navigation control information;
 a third device configured for obtaining split-mount feedback data transmitted by the driving monitor split-mount device based on the communication protocol, the split-mount feedback data includes driving information obtained by the driving monitor split-mount device, wherein the driving information includes at least any one of the following: velocity information, barrier information, and pedestrian information; and
 a fourth device configured for performing a corresponding business logic based on the split-mount feedback data, and presenting a corresponding augmented reality effect based on an execution result of the business logic, wherein the business logic includes at least any one of the following: displaying key navigation information, and prompting barrier information or pedestrian information.

Figure 6:
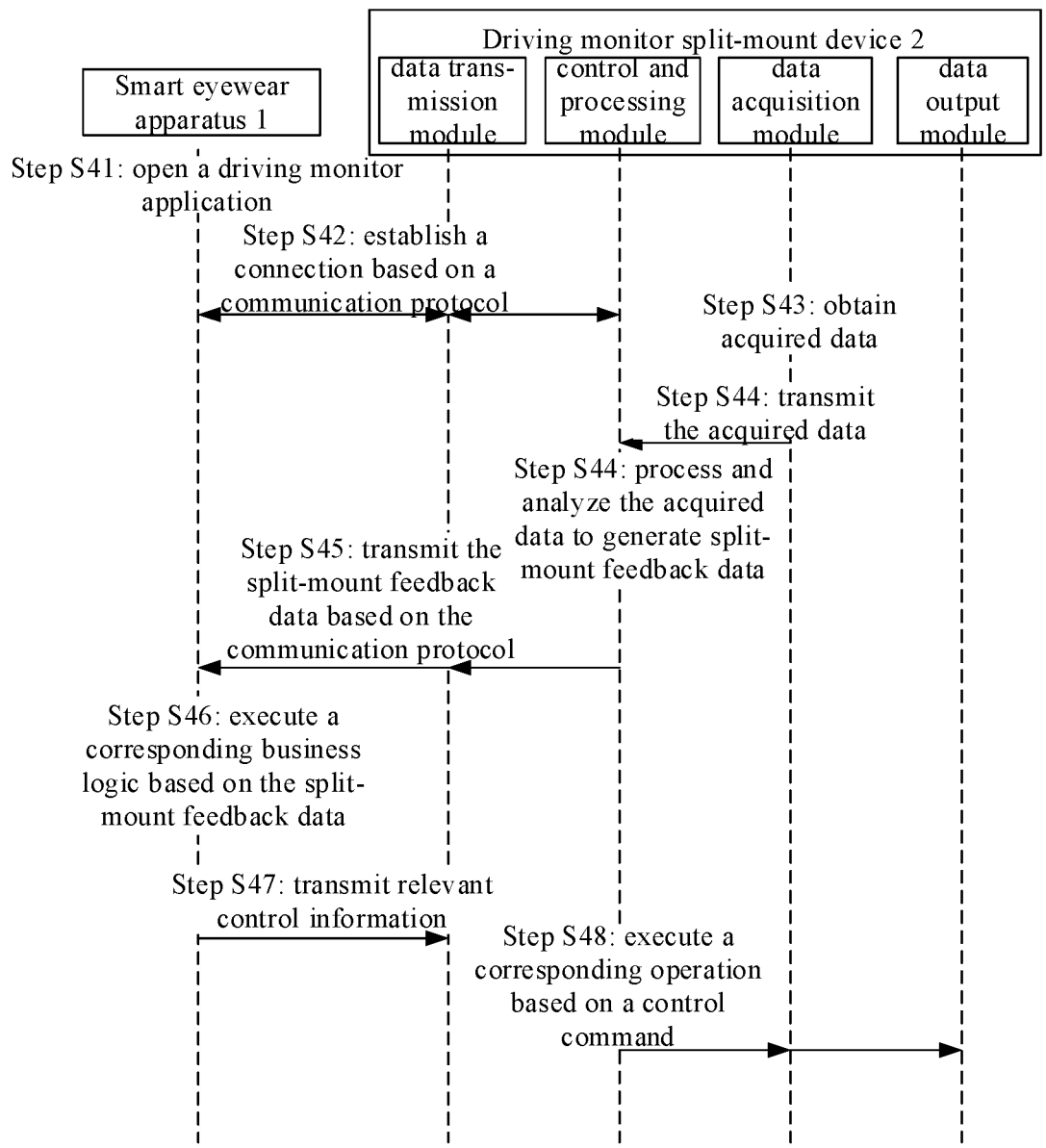
FIG. 6 shows a flow schematic diagram of cooperation between a smart eyewear apparatus and a driving monitoring split-mount device for implementing augmented reality interaction and presentation in a driving monitoring scene provided according to an embodiment of the present disclosure.

FIG. 6 shows a flow schematic diagram of cooperation between a smart eyewear apparatus 1 for implementing augmented reality interaction and presentation and a driving monitoring split-mount device 2 in a driving monitoring scene provided according to an embodiment of the present disclosure, wherein in a driving scene, the smart eyewear apparatus and the driving monitor split-mount device (e.g., a driving monitor device) cooperates to implement interaction. With the driving monitor device as an example, the driving monitor device is a device having an autonomous processing capability, mainly including four major modules: a data acquisition module, a control and processing module, a data transmission module, and a data output module. The driving monitor device has its own control and processing center and may independently perform a complete function. Before being connected to the smart eyewear apparatus, the driving monitor device may run as a standalone device; after being connected to the smart eyewear apparatus, the driving monitor device may exchange data (processed data) with the smart eyewear apparatus through a protocol and receive instructions to implement specified functions. A split-mount device such as the driving monitor split-mount device may be connected to the smart eyewear apparatus in a similar manner of connecting a mobile phone to the computer.

In some embodiments, a procedure of cooperating between the smart eyewear apparatus 1 and the driving monitor split-mount device 2 comprises:
 Step S41: first, opening, by the smart eyewear apparatus 1, an application for driving monitor according to a user instruction, e.g., a map application or a navigation application;
 Step S42: then, establishing a communication connection with the driving monitor split-mount device 2 (e.g., a driving monitor device) based on the communication protocol, wherein the communication connection between the smart eyewear apparatus 1 and the driving monitor split-mount device 2 is established via a data transmission module, wherein the data transmission module may be a wired connection, a wireless network (WiFi) or Bluetooth device, and the driving monitor split-mount device 2 has a control and processing module (e.g., an embedded chip, but not limited thereto);
 Step S43: obtaining, by a data acquisition module of the driving monitor split-mount device 2, various kinds of acquired data, e.g., information such as velocity, rotating speed of the wheels, pedestrian, barrier, and landmark, etc., acquired by a camera or a vehicle control system;
 Step S44: collecting, by the control and processing module, the acquired data obtained by the data acquisition module of the driving monitor split-mount device 2, processing and analyzing the acquired data so as to generate split-mount feedback data;
 Step S45: transmitting, by the the driving monitor split-mount device 2, the generated split-mount feedback data to the smart eyewear apparatus 1 via a data transmission module based on the communication protocol;
 Step S46: next, obtaining, by the smart eyewear apparatus 1, the split-mount feedback data based on the communication protocol, and executing a corresponding business logic, e.g., displaying key navigation information, highlighting pedestrian location, etc.;
 Step S47: besides, further generating, by the smart eyewear apparatus 1, relevant control information based on user interaction and transmit the relevant control information for controlling relevant operations of the driving monitor split-mount device 2 to the driving monitor split-mount device 2, e.g., control information such as Start Recording, Start Voice Navigation, etc., wherein the execution sequences between step S47 and steps S41~S46 are not limited;

Step S48: afterwards, performing, by the driving monitor split-mount device 2, a corresponding operation based on the relevant control information, including: recording, shooting, and playing navigation information using the data output module (including a speaker, etc.).

On the basis of the smart eyewear apparatus 1 shown in FIG. 1, there is provided a smart eyewear apparatus 1 for implementing augmented reality interaction and presentation in a game control according to an embodiment of the present disclosure, wherein the smart eyewear apparatus 1 comprising:

a first device configured for establishing a communication connection with a game control split-mount device 2 based on a communication protocol;

a second device configured for transmitting relevant control information to the game control split-mount device 2 based on the communication protocol, wherein the relevant control information includes at least any one of the following: control information on acquiring perception data, and control information on displaying special effect;

a third device configured for obtaining the split-mount feedback data transmitted by the game control split-mount device 2 based on the communication protocol, wherein the split-mount feedback data includes game relevant information obtained by the game control split-mount device 2, wherein the game relevant information includes: user operation information; and a fourth device configured for executing a corresponding business logic based on the split-mount feedback data, and presenting a corresponding augmented reality effect related to the game based on an execution result of the business logic.

Figure 7:
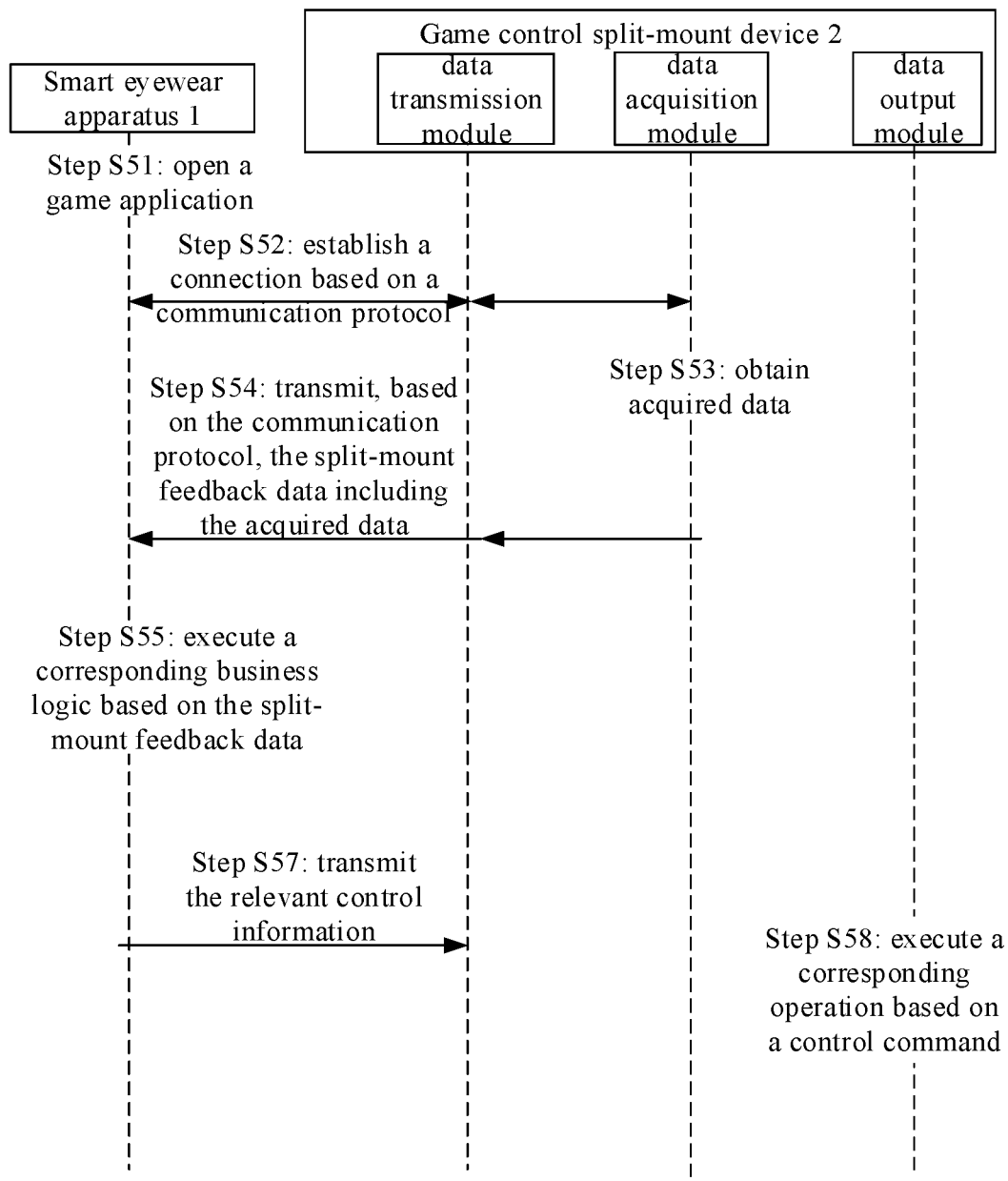
FIG. 7 shows a flow schematic diagram of cooperation between a smart eyewear apparatus and a game control split-mount device for implementing augmented reality interaction and presentation in a game control scene provided according to an embodiment of the present disclosure.

FIG. 7 shows a flow schematic diagram of cooperation between a smart eyewear apparatus for implementing augmented reality interaction and presentation and a game control split-mount device in a game control scene provided according to an embodiment of the present disclosure, which is a signal flow schematic diagram in a game scene between the smart eyewear apparatus and the game control split-mount device (e.g., a game glove, a joystick, a shooting gun, or other game gears). With the game control split-mount device as an example, the game control split-mount device mainly includes three major modules: a data acquisition module, a data transmission module, and a data output module. The game control split-mount device takes the smart eyewear apparatus as a control and processing center; after being connected to the smart eyewear apparatus through a protocol, the game control split-mount device inputs the acquired data (unprocessed data) to the eyewear, accepts and outputs the data processed by the eyewear, and performs specified functions. The game control split-mount device is connected to the smart eyewear apparatus in a similar manner of connecting a periphery such as a mouse or keyboard to a computer.

Particularly, a procedure of cooperating between the smart eyewear apparatus 1 and the game control split-mount device 2 comprises:

Step S51: first, opening, by the smart eyewear apparatus 1, a game application according to a user instruction;

Step S52: then, establishing a communication connection with the game control split-mount device 2 based on a communication protocol, wherein the communication connection between the smart eyewear apparatus 1 and the game control split-mount device 2 is established by a data transmission module, wherein the data transmission module may be a wired connection, a wireless network (WiFi) or Bluetooth device;

Step S53: acquiring, by the data acquisition module of the game control split-mount device 2, various acquired data, e.g., the user's action, gesture, and control of a control key or joystick of the game control split-mount device 2, etc.;

Step S54: transmitting, by the game control split-mount device 2, the split-mount feedback data including the acquired data to the smart eyewear apparatus 1 via a data transmission module based on the communication protocol;

Step S55: next, executing, by the smart eyewear apparatus 1, a corresponding game business logic based on the split-mount feedback data, e.g., controlling the avatar, objects, and scene in the game to change, etc.;

Step S56: generating, by the smart eyewear apparatus 1, relevant control information of the relevant operation based on user interaction;

Step S57: next, transmitting, by the smart eyewear apparatus 1, the generated relevant control information to the game control split-mount device 2 based on the communication protocol, e.g., controlling the game control split-mount device 2 to generate a corresponding game special effect, wherein the execution sequences between the step S57 and steps S51~S56 are not limited; and Step S58: afterwards, performing, by the game control split-mount device 2, a corresponding operation based on the relevant control information, including: playing a special effect audio, generating vibration, warm sense, and cold sense, etc.

Figure 8:
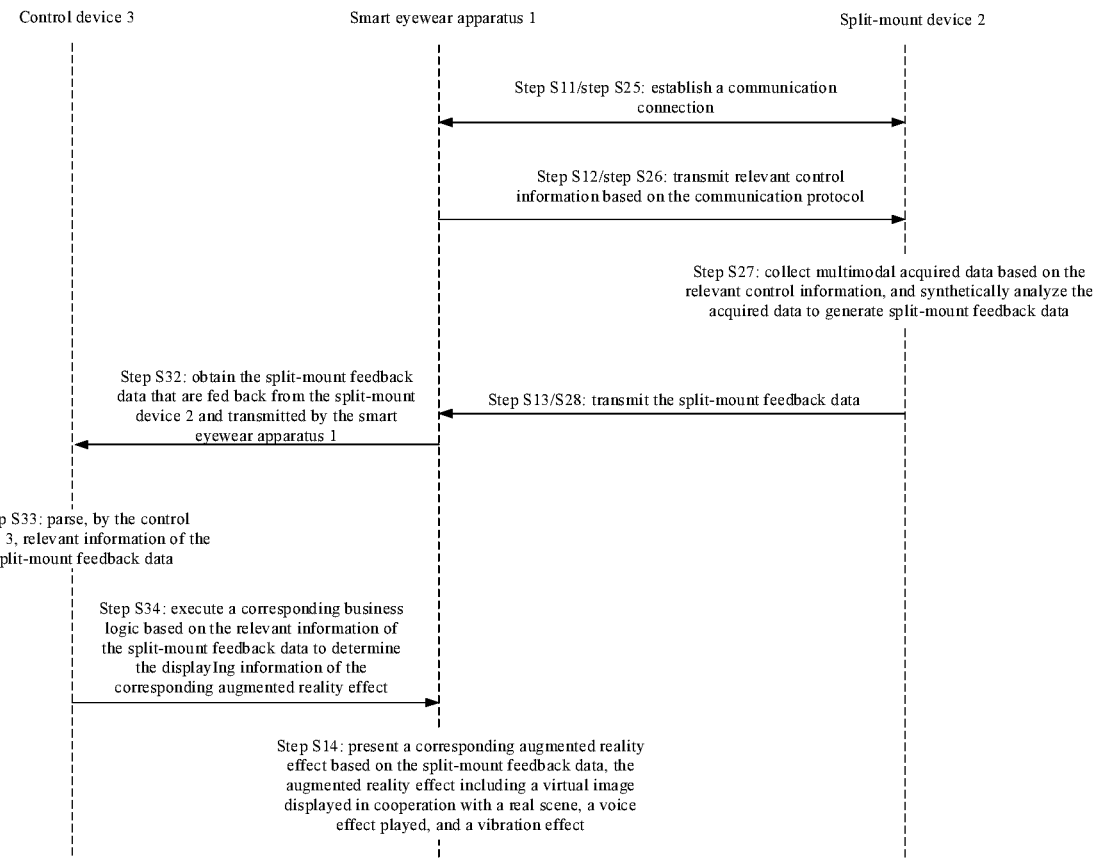
FIG. 8 shows a flow schematic diagram of a method for cooperating between a smart eyewear apparatus 1, a split-mount device 2, and a control device 3 for implementing augmented reality interaction and presentation provided according to an embodiment of the present disclosure.

FIG. 8 shows a flow schematic diagram of a method for cooperating between a smart eyewear apparatus 1 for implementing augmented reality interaction and presentation, a split-mount device 2, and a control device 3 provided according to an embodiment of the present disclosure.

The method implemented in the smart eyewear apparatus end comprises a step S11, a step S12, a step S13, and a step S14, wherein the step S11, the step S12, the step S13, and the step S14 as shown in FIG. 8 are identical or substantially identical to the step S11, the step S12, the step S13, and the step S14 shown in FIG. 4. The method implemented in the split-mount device 2 comprises a step S25, a step S26, a step S27, and a step S28, wherein the step S25, the step S26, the step S27, and the step S28 as shown in FIG. 8 are identical or substantially identical to the step S25, the step S26, the step S27, and the step S28 shown in FIG. 5. For the sake of brevity, they are not detailed here, but incorporated herein by reference.

Here, the control device 3 may be an electronic device which may automatically perform numerical computation and information processing according to preset or stored instructions, hardware of which includes, but not limited to, a microprocessor, an application-specific integrated circuit (ASIC), a field programmable gate array (FPGA), a digital processor (DSP), an embedded device, etc. The control device 3 may be a device having an autonomous processing capability, which may have an independent and complete function. After being connected to the smart eyewear apparatus, the control device 3 may assist the smart eyewear apparatus to establish a core technical logic, store relevant data, and feed back relevant control information, etc. Besides, the control device 3 may further provide a touch input device available for the user to perform a touch operation. Of course, those skilled in the art may understand that the control devices 3 above is only an example, and other existing or future possibly emerging control device 3, if applicable to the present application, should also be included in the protection scope of the present disclosure and is thus incorporated herein by reference.

Particularly, the method implemented in the control device 3 end comprises: a step S32, a step S33, and a step S34. In some embodiments, in the step S32, the control device 3 acquires the split-mount feedback data that are fed back from the split-mount device 2 and transmitted from the smart eyewear apparatus 1; in the step S33, the control device 3 parses relevant information of the split-mount feedback data, wherein the relevant information includes at least any one of the following: priority information, presentation related information, and parameter information; and in the step S34, the control device 3 executes the corresponding business logic based on the relevant information of the split-mount feedback data to determine displaying information of the corresponding augmented reality effect, wherein the displaying information includes at least any of the following: virtual image presentation information, voice presentation information, and vibration presentation information, and transmits the displaying information of the corresponding augmented reality effect to the smart eyewear apparatus.

Further, the method further comprises: the control device 3 obtaining multimodal scene information transmitted by the smart eyewear apparatus, the multimodal scene information including real scene information, virtual scene information, and user operation information which are acquired by the smart eyewear apparatus, wherein the user operation information includes at least any one of the following: gesture information, voice information, perception information, and touch operation information; and wherein the control device 3 comprehensively processes the multimodal scene information to generate the relevant control information and transmits the relevant control information to the smart eyewear apparatus 1.

The control device 3 may also have an operation input function. In some embodiments, the control device further obtains touch operation information of the user for the control device, and transmits the touch operation information to the smart eyewear apparatus. Correspondingly, the control device 3 may also comprehensively processes the multimodal scene information and the touch operation information so as to generate the relevant control information.

Figure 9:
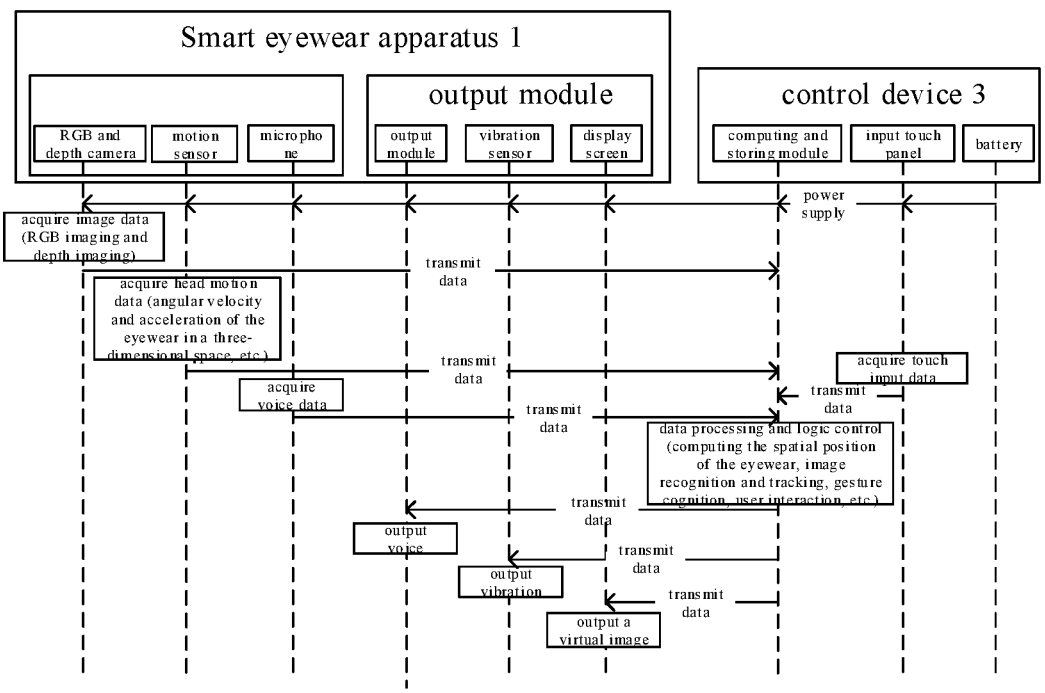
FIG. 9 shows a flow schematic diagram of a method for cooperating between a smart eyewear apparatus 1 and a control device 3 for implementing augmented reality interaction and presentation in a specific scene provided according to an embodiment of the present disclosure.

FIG. 9 shows a flow schematic diagram of a method for cooperating between a smart eyewear apparatus 1 for implementing augmented reality interaction and presentation and a control device 3 in a specific scene provided according to an embodiment of the present disclosure.

The smart eyewear apparatus 1 comprises an input module and an output module, the input module including a RGB camera, a depth camera, a motion sensor and a microphone, wherein the RGB camera may acquire scene information, the depth camera may acquire gesture information, the motion sensor may acquire perception information such as the angular velocity and acceleration of the smart eyewear apparatus in a three-dimensional space, the microphone acquires voice information and transmits the various input data acquired to a computing and storing module of the control device 3, wherein the computing and storing module performs data processing and logic control, including computing the space position of the smart eyewear apparatus 1, image recognition and tracking, gesture recognition, and user interaction instruction, etc., and feeds back a corresponding processing result to the output module of the smart eyewear apparatus 1; the output module outputs voice using the speaker, outputs vibration using the vibration sensor, and displays a corresponding virtual image using the display screen, etc. During this period, the control device 2 may also acquire user touch input data using its own input touch panel and transmit the touch input data to the computing and storing module for data processing and logic control together.

Compared with the prior art, the method for implementing augmented reality interaction and presentation, the smart eyewear apparatus, and the split-mount device according to the embodiments of the present disclosure may better implement a better user interaction experience with a linking between online information and offline information and a fusion of virtuality and reality by: establishing a communication connection between the smart eyewear apparatus and the split-mount device based on a communication protocol, where with the smart eyewear apparatus as the core of interaction, the split-mount device may be controlled to implement a corresponding function; presenting a corresponding augmented reality effect based on split-mount device feedback data transmitted from the split-mount device to thereby extend a function of the smart eyewear apparatus to the split-mount device; and further presenting the split-mount feedback data from the split-mount device onto the smart eyewear apparatus.

Further, by configuring a control device physically detached from the smart eyewear apparatus and establishing a communication connected between them in a wired or wireless manner, processing core business logic (including relevant control information of the split-mount device, multimodal scene fusion processing, etc.) of the smart eyewear apparatus is taken over by the control device 3, such that the smart eyewear apparatus 1 per se may become smaller in size and lighter in weight; besides, use discomfort for users caused by over heat radiation of the smart eyewear apparatus may be avoided.

It should be noted that the present disclosure may be implemented in software and/or a combination of software and hardware; for example, it may be implemented by a application-specific integrated circuit (ASIC), a general-purpose computer, or any other similar hardware device. In one embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

In addition, a part of the present disclosure may be applied as a computer program product, for example, a computer program instruction, which, when executed by a computer, through the operation of the computer, may invoke or provide the method and/or technical solution according to the present disclosure. However, the program instructions invoking the method of the present disclosure may be stored in a fixed or removable recording medium, and/or transmitted through a data stream in broadcast or other signal bearer medium, and/or stored in the working memory of a computer device running according to the program instructions. Here, one embodiment according to the present disclosure includes a device, which includes a memory for storing computer program instructions and a processor for executing program instructions, wherein, when the computer program instructions are executed by the processor, the device is triggered to run the methods and/or technical solutions based on the previously mentioned multiple embodiments of the present disclosure.

To those skilled in the art, it is apparent that the present disclosure is not limited to the details of the above exemplary embodiments, and the present disclosure may be implemented with other forms without departing from the spirit or basic features of the present disclosure.

Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

What is claimed is:

1. A method, at a smart eyewear apparatus end, for implementing augmented reality interaction and presentation, comprising:
    establishing a communication connection with a split-mount device based on a communication protocol, wherein the split-mount device is physically separate from the smart eyewear apparatus and has one or more cameras;
    transmitting relevant control information to the split-mount device based on the communication protocol, wherein the split-mount device controls the one or more cameras to collect acquired data according to the control information, the acquired data includes at least one of the following: image acquisition data and voice acquisition data;
    generating, by the split-mount device, split-mount feedback data;
    obtaining the split-mount feedback data and relevant information transmitted by the split-mount device based on the communication protocol, wherein the relevant information of the split-mount feedback data includes at least any one of the following: priority information, presentation related information, and parameter information; and
    presenting a corresponding augmented reality effect based on the split-mount feedback data, the priority information, the presentation related information, and the parameter information;
    wherein transmitting relevant control information to the split-mount device based on the communication protocol further comprises:
    obtaining multimodal scene information, the multimodal scene information including real scene information, virtual scene information, and user operation information, wherein the user operation information includes at least any one of the following: gesture information, voice information, perception information, and touch operation information;
    transmitting the multimodal scene information to the control device; and
    obtaining the relevant control information generated by the control device based on comprehensive processing of the multimodal scene information and the touch operation information;
    wherein the smart eyewear apparatus comprises one or more cameras configured to capture first images of view of the smart eyewear apparatus, the split-mount feedback data includes second images captured by the split-mount device from a different view than that of the smart eyewear apparatus, and the smart eyewear apparatus presents a corresponding augmented reality effect based on the first images and the split-mount feedback data;
    wherein the smart eyewear apparatus determines a first topic of the first images and a second topic of the second images respectively, selects the one of higher priority from these two topics, and determines an augmented reality effect corresponding to the chosen topic.

2. The method according to claim 1, wherein presenting a corresponding augmented reality effect based on the split-mount feedback data, further comprises:
    parsing relevant information of the split-mount feedback data; and
    executing a corresponding business logic based on the relevant information of the split-mount feedback data to determine displaying information of the corresponding augmented reality effect.

3. The method according to claim 1, wherein presenting a corresponding augmented reality effect based on the split-mount feedback data further comprises:
    transmitting the split-mount feedback data to a control device; and
    obtaining displaying information of the corresponding augmented reality effect determined by the control device through parsing the split-mount feedback data.

4. The method according to claim 1, wherein transmitting relevant control information to the split-mount device based on the communication protocol, further comprises:
    obtaining multimodal scene information, the multimodal scene information including real scene information, virtual scene information, and user operation information, wherein the user operation information includes at least any one of the following: gesture information, voice information, perception information, and touch operation information; and
    processing the multimodal scene information to generate the relevant control information.

5. The method according to claim 1, wherein presenting a corresponding augmented reality effect based on the split-mount feedback data, further comprises:
    transmitting, to the split-mount device, auxiliary control information for controlling the split-mount device to present an auxiliary effect.

6. The method according to claim 1, wherein establishing a communication connection with a split-mount device based on a communication protocol, comprises:
    establishing a communication connection with the split-mount device in a wired or wireless manner based on the communication protocol.

7. A non-transitory computer readable storage medium, including computer code, which, when being executed, causes a method according to claim 1 to be executed.

8. A method, at a smart eyewear apparatus end, for implementing augmented reality interaction and presentation in driving monitoring, comprising:

establishing a communication connection with a driving monitor split-mount device based on a communication protocol, wherein the driving monitor split-mount device is physically detached from the smart eyewear apparatus;

transmitting relevant control information to the driving monitor split-mount device based on the communication protocol, wherein the driving monitor split-mount device collects acquired data according to the control information, the acquired data includes at least one of the following: image acquisition data and voice acquisition data, the control information includes at least any one of the following: real-time positioning control information, real-time video recording control information, and real-time voice navigation control information;

generating, by the split-mount device, split-mount feedback data;

obtaining the split-mount feedback data and relevant information transmitted by the driving monitor split-mount device based on the communication protocol, the split-mount feedback data includes driving information obtained by the driving monitor split-mount device, wherein the driving information includes at least any one of the following: velocity information, barrier information, and pedestrian information, the relevant information of the split-mount feedback data includes at least any one of the following: priority information, presentation related information, and parameter information;

performing a corresponding business logic based on the split-mount feedback data, and presenting a corresponding augmented reality effect based on an execution result of the business logic, the priority information, the presentation related information, and the parameter information, wherein the business logic includes at least any one of the following: displaying key navigation information, and prompting barrier information or pedestrian information;

wherein transmitting relevant control information to the driving monitor split-mount device based on the communication protocol further comprises:

obtaining multimodal scene information, the multimodal scene information including real scene information, virtual scene information, and user operation information, wherein the user operation information includes at least any one of the following: gesture information, voice information, perception information, and touch operation information;

transmitting the multimodal scene information to the control device; and obtaining the relevant control information generated by the control device based on comprehensive processing of the multimodal scene information and the touch operation information.

9. A non-transitory computer readable storage medium, including computer code, which, when being executed, causes a method according to claim 8 to be executed.

10. A method, at a split-mount device end, for cooperating to implement augmented reality interaction and presentation, comprising:

establishing a communication connection with a smart eyewear apparatus based on a communication protocol, wherein the split-mount device is physically separate from the smart eyewear apparatus and has one or more cameras;

obtaining multimodal scene information, the multimodal scene information including real scene information, virtual scene information, and user operation information, wherein the user operation information includes at least any one of the following: gesture information, voice information, perception information, and touch operation information;

transmitting the multimodal scene information to the control device;

obtaining the relevant control information generated by the control device based on comprehensive processing of the multimodal scene information and the touch operation information, and transmitted by the smart eyewear apparatus based on the communication protocol;

collecting acquired data based on the relevant control information, wherein the acquired data include at least any one of the following: image acquisition data, data acquired for perception positioning, and voice acquisition data;

analyzing the acquired data, obtaining relevant information of the split-mount feedback data, and generating split-mount feedback data, wherein the relevant information of the split-mount feedback data includes at least any one of the following: priority information, presentation related information, and parameter information; and transmitting the split-mount feedback data to the smart eyewear apparatus based on the communication protocol so as to cooperate with the smart eyewear apparatus to present a corresponding augmented reality effect based on the priority information, the presentation related information, and the parameter information;

wherein the smart eyewear apparatus comprises one or more cameras configured to capture first images of view of the smart eyewear apparatus, the split-mount feedback data includes second images captured by the split-mount device from a different view than that of the smart eyewear apparatus, and the smart eyewear apparatus presents a corresponding augmented reality effect based on the first images and the split-mount feedback data;

wherein the smart eyewear apparatus determines a first topic of the first images and a second topic of the second images respectively, selects the one of higher priority from these two topics, and determines an augmented reality effect corresponding to the chosen topic.

11. The method according to claim 10, further comprising:

obtaining auxiliary control information the smart eyewear apparatus executes the corresponding business logic based on the split-mount feedback data and transmits, and presenting a corresponding auxiliary effect based on the auxiliary control information, wherein the auxiliary effect includes at least any one of the following: auxiliary voice effect, auxiliary vibration effect, and auxiliary visual effect.

12. The method according to claim 10, wherein establishing a communication connection with a smart eyewear apparatus based on a communication protocol, comprises:

establishing a communication connection with the smart eyewear apparatus in a wired or wireless manner based on the communication protocol.

13. A non-transitory computer readable storage medium, including computer code, which, when being executed, causes a method according to claim 10 to be executed.

14. A method, at a control device end, for cooperating to implement augmented reality interaction and presentation, wherein the control device is physically detached from a smart eyewear apparatus, the method comprising:

obtaining multimodal scene information transmitted by the smart eyewear apparatus, wherein the multimodal scene information includes real scene information, virtual scene information, and user operation information obtained by the smart eyewear apparatus, and wherein the user operation information includes at least any one of the following: gesture information, voice information, perception information, and touch operation information;

obtaining touch operation information of a user on the control device;

comprehensively processing the multimodal scene information and the touch operation information of the user on the control device so as to generate the relevant control information, and transmitting the relevant control information to the smart eyewear apparatus;

generating, by the split-mount device, split-mount feedback data;

obtaining the split-mount feedback data and relevant information transmitted by the smart eyewear apparatus;

parsing relevant information of the split-mount feedback data, wherein the relevant information of the split-mount feedback data includes at least any one of the following: priority information, presentation related information, and parameter information; and executing a corresponding business logic based on the relevant information of the split-mount feedback data to determine displaying information of a corresponding augmented reality effect, and transmitting the displaying information of the corresponding augmented reality effect to the smart eyewear apparatus.

15. The method according to claim 14, further comprising:

establishing a communication connection with the smart eyewear apparatus in a wired or wireless manner.

16. A non-transitory computer readable storage medium, including computer code, which, when being executed, causes a method according to claim 14 to be executed.

* * * * *